US007036906B2

(12) United States Patent
Takano et al.

(10) Patent No.: US 7,036,906 B2
(45) Date of Patent: May 2, 2006

(54) LIQUID DROPLET EJECTION APPARATUS, METHOD OF MANUFACTURING ELECTROOPTIC DEVICE, ELECTROOPTIC DEVICE AND ELECTRONIC DEVICE

(75) Inventors: Yutaka Takano, Nagano-ken (JP); Shinichi Nakamura, Okaya (JP); Hidenori Usuda, Matsumoto (JP); Yoshiaki Yamada, Shimosuma-machi (JP)

(73) Assignee: Seiko Epson Corporation, (JP)

( * ) Notice: Subject to any disclaimer, the term of this patent is extended or adjusted under 35 U.S.C. 154(b) by 161 days.

(21) Appl. No.: 10/632,554

(22) Filed: Aug. 1, 2003

(65) Prior Publication Data
US 2004/0075704 A1 Apr. 22, 2004

(30) Foreign Application Priority Data

Aug. 2, 2002 (JP) .............................. 2002-226475
Jun. 30, 2003 (JP) .............................. 2003-187837

(51) Int. Cl.
*B41J 23/00* (2006.01)
*B41J 25/308* (2006.01)
*B41J 11/20* (2006.01)

(52) U.S. Cl. ............................... 347/37; 347/8; 400/59
(58) Field of Classification Search .................... 347/8, 347/37, 43, 106; 400/56–59
See application file for complete search history.

(56) References Cited

U.S. PATENT DOCUMENTS 5,949,447 A * 9/1999 Arai et al. .................... 347/23
5,984,470 A * 11/1999 Sakino et al. ............... 347/106
6,561,606 B1 * 5/2003 Yoshida ......................... 347/8
6,629,787 B1 * 10/2003 Lee et al. ..................... 400/59

FOREIGN PATENT DOCUMENTS

| JP | 09-049920 | 2/1987 |
| JP | 06-253119 | 9/1994 |
| JP | 11-162815 | 6/1999 |
| JP | 2000-048716 | 2/2000 |
| JP | 2001-150653 | 6/2001 |
| JP | 2001-162889 | 6/2001 |
| JP | 2001-239203 | 9/2001 |
| JP | 2002-052731 | 2/2002 |
| JP | 2002-120374 | 4/2002 |
| JP | 2002-198304 | 7/2002 |
| JP | 2003-159556 | 6/2003 |

OTHER PUBLICATIONS

Communication from Japanese Patent Office re: counterpart application.

* cited by examiner

*Primary Examiner*—Shih-Wen Hsieh
(74) *Attorney, Agent, or Firm*—Harness, Dickey & Pierce, P.L.C.

(57) ABSTRACT

A liquid droplet ejection apparatus in which a function liquid droplet is selectively ejected toward a workpiece while carrying out a relative movement between a function liquid droplet ejection head and the workpiece is made up of: a plurality of function liquid droplet ejection heads; a carriage for mounting thereon the plurality of function liquid droplet ejection heads; a head stocker for stocking the plurality of function liquid droplet ejection heads; and a head transfer mechanism for transferring each of the plurality of function liquid droplet ejection heads between the carriage and the head stocker. The function liquid droplet ejection heads are automatically replaced, so that the liquid droplet ejection apparatus can perform the workpiece processing efficiently.

6 Claims, 28 Drawing Sheets

F I G. 1
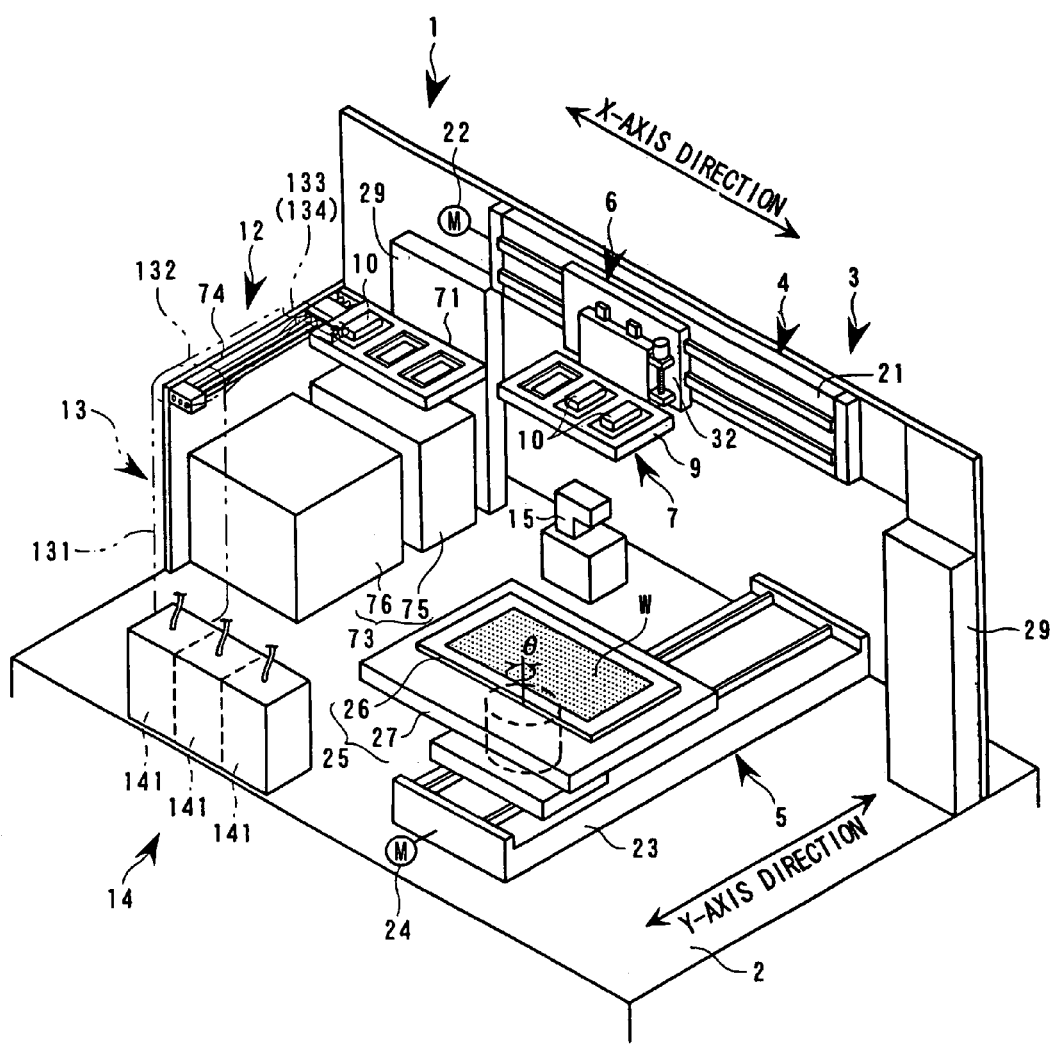

EJECTION WAVEFORM

FINE-VIBRATION WAVEFORM

F I G. 2 7
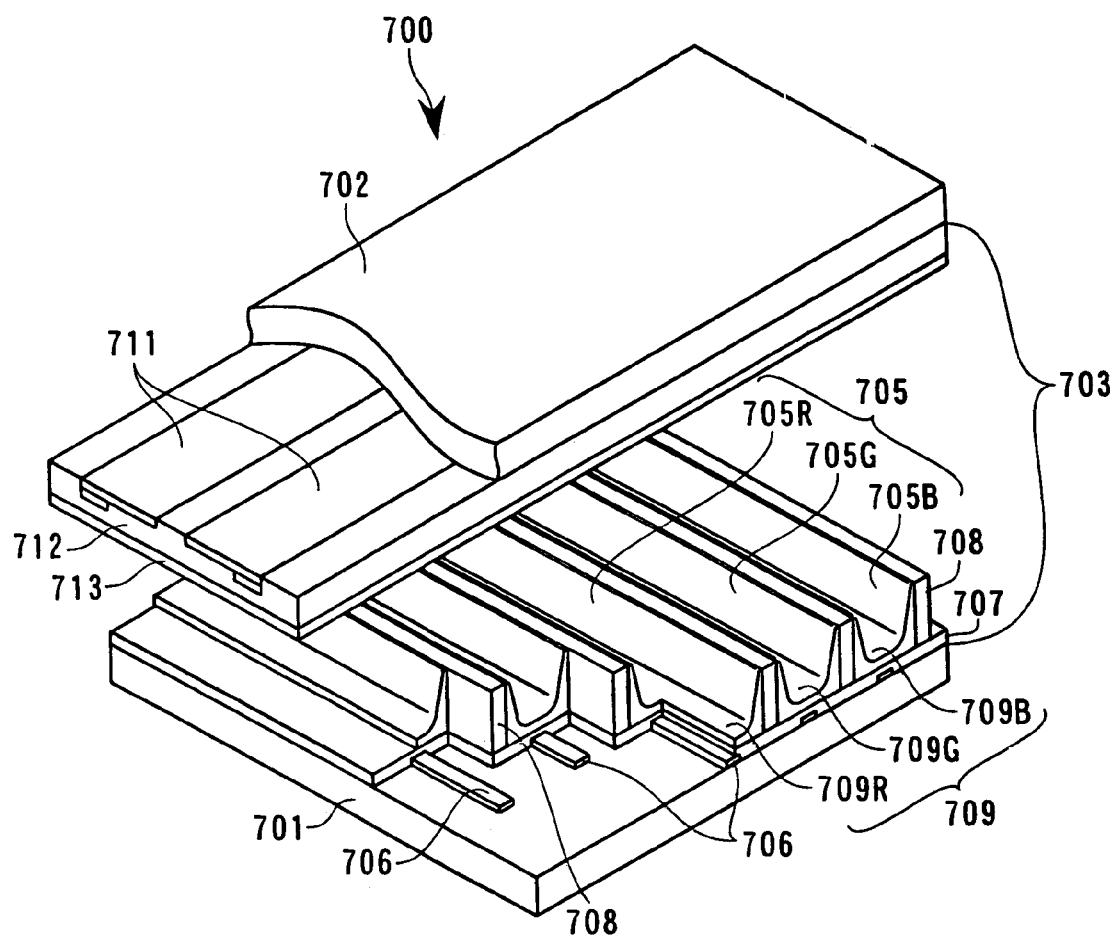

LIQUID DROPLET EJECTION APPARATUS, METHOD OF MANUFACTURING ELECTROOPTIC DEVICE, ELECTROOPTIC DEVICE AND ELECTRONIC DEVICE

BACKGROUND OF THE INVENTION (1) Field of the Invention

This invention relates to a liquid droplet ejection apparatus which performs the ejection of function liquid droplet toward a workpiece such as a substrate, or the like, by means of a function liquid droplet ejection head as represented by an ink jet head. This invention relates in particular to a liquid droplet ejection apparatus which is capable of adjusting a workpiece gap between the workpiece and the function liquid droplet ejection head, a method of manufacturing an eletrooptic device, an electrooptic device, and to an electronic device.

(2) Description of the Related Art

In a conventional liquid droplet ejection apparatus such as an ink jet printer (color printer), or the like, the function liquid droplet ejection head is driven while scanning the function liquid droplet head (ink jet head) relative to an object such as paper, or the like, to which the liquid is ejected (object of ejection, or workpiece), thereby selectively ejecting the function liquid to the object of ejection to process the workpiece. At that time, in order to control the flight curve and the diameter of the fired or hit droplet at a higher accuracy, the space between the workpiece surface and the nozzle surface of the function liquid droplet ejection head, i.e., the workpiece gap (or paper gap) is controlled at a higher accuracy (see, for example, Published Unexamined Japanese Patent Application No. 162889/2001).

In the applied art in which the liquid droplet ejection apparatus is applied to the color filter and the organic electroluminescence (EL) device, there are cases in which the workpieces in the form of substrates of different sizes and thicknesses are introduced. If the liquid droplet ejection apparatus must be stopped each time in order to deal with such varying conditions, there is a problem in that the work becomes complicated and the tact time for the workpiece processing becomes ling.

SUMMARY OF THE INVENTION

This invention has an object of providing a liquid droplet ejection apparatus which is capable of automatically fine-adjusting the workpiece gap between the workpiece and the function liquid droplet ejection head, a method of manufacturing an eletrooptic device, an electrooptic device, and an electronic device.

According to this invention, there is provided a liquid droplet ejection apparatus comprising: a function liquid droplet ejection head disposed such that a nozzle surface thereof lies in parallel with a workpiece; gap measuring means for measuring a workpiece gap between a workpiece surface and a nozzle surface; and gap adjusting means for adjusting the workpiece gap based on a result of measurement by the gap measuring means, the adjusting being made by relative movement of the function liquid droplet ejection head and the workpiece in a vertical direction.

According to this arrangement, when a workpiece has been newly introduced, the workpiece gap is measured by driving the gap measuring means and, based on the result of this measurement, the gap adjusting means is driven. The workpiece gap is thus subjected to fine adjustment by the relative movement in the vertical (up and down) direction between the function liquid droplet ejection head and the workpiece. Since the workpiece gap can thus be automatically adjusted, it is possible to include the workpiece gap adjustment step in the series of workpiece processing steps. The gap adjustment may be performed by vertically moving the function liquid droplet ejection head, by vertically moving the workpiece, and by vertically moving both the function liquid droplet ejection head and the workpiece.

Preferably, the function liquid droplet ejection head is mounted on a carriage, and the gap adjusting means comprises: a base which supports the carriage in a manner slidable in a vertical direction; an actuator which is fixed to the base; a male screw member which rotates in one direction and in an opposite direction by the actuator; and a female screw member which is provided in the carriage so as to engage in a screwed manner with the male screw member.

According to this arrangement, when the screw member is rotated by the actuator in one direction and in the opposite direction, the carriage finely moves in the vertical direction through the female screw member. In other words, by vertically moving the function liquid droplet ejection head by means of the actuator through the carriage, the workpiece gap can be finely adjusted.

Preferably, the gap adjusting means moves the function liquid ejection head in a vertical direction relative to the workpiece. The liquid droplet ejection apparatus further comprises: a function liquid tank for supplying the function liquid droplet ejection head with a function liquid; and water head adjusting means for adjusting a water head of the function liquid ejection head relative to the function liquid tank by vertically moving the function liquid droplet tank based on the result of measuring by the gap measuring means.

When the function liquid droplet ejection head is vertically moved in the gap adjustment work, the water head of the function liquid varies between the function liquid tank that is fixedly provided and the function liquid droplet ejection head, whereby the amount of ejection of the function liquid becomes unstable. According to this arrangement, on the other hand, the function liquid tank can be vertically moved by the water head adjusting means, so that the water head of the function liquid droplet ejection head relative to the function liquid tank can be adequately maintained. Therefore, even if the function liquid droplet ejection head is vertically moved to thereby adjust the gap, the amount of ejection of the function liquid droplet will not be unstable.

Preferably, the function liquid tank is held by a tank holder, and the water head adjusting means comprises: a tank base for supporting said tank holder in a manner slidable in a vertical direction; an actuator which is fixed to the tank base; a male screw member which is rotated by the actuator in one direction and in an opposite direction; and a female screw member which is provided in the tank holder so as to be engaged in a screwed manner with the male screw member.

According to this arrangement, when the male screw member rotates in one direction and in the opposite direction by the actuator, the tank holder slightly moves in the vertical direction through the female screw member. In other words, by vertically moving the function liquid tank through the tank holder, the water head of the function liquid droplet ejection head relative to the function liquid tank can be adequately maintained.

Preferably, the function liquid droplet ejection head further comprises a function liquid supply means for supplying the function liquid tank with a function liquid; and a liquid level sensor for detecting a liquid level inside the function liquid tank. The function liquid supply means supplies the function liquid so as to attain a constant liquid level in the function liquid tank based on a result of detection by the liquid level sensor.

According to this arrangement, by the cooperation of the function liquid supply means and the liquid level sensor, the liquid level in the function liquid tank can always be maintained constant. Further, it is possible to dispose the function liquid tank in a fixed manner and it is also possible to stably supply the function liquid tank with the function liquid even without making the function liquid tank large in size. In particular, since the function liquid tank is restricted in its height of installation, there is an advantage from the viewpoint of saving the space of installation by making it small in size.

Preferably, the function liquid droplet ejection head is mounted on the carriage, and the gap measuring means comprises: position measuring means for measuring a position of the workpiece in a vertical direction, the position measuring means being mounted on the carriage; and computing means for computing the workpiece gap based on a result of measurement by the position measuring means.

According to this arrangement, the position measuring means is mounted on the carriage, and the position of the workpiece (position of the surface of the workpiece) is measured by the position measuring means. Therefore, the workpiece gap can be easily computed based on the positional relationship between the carriage and the worktable. It may be so arranged that a workpiece recognition camera, or the like, is utilized as the position measuring means to thereby obtain the workpiece gap.

Preferably, workpiece is set in position on a worktable, and the gap measuring means comprise: position measuring means for measuring a position of the workpiece and a position of the worktable in a vertical direction; and computing means for computing the workpiece gap based on a result of measurement by the position measuring means.

According to this arrangement, the thickness of the workpiece is computed by the position measuring means disposed on, e.g., the apparatus frame, based on the position of the workpiece and the position of the worktable. The workpiece gap can thus be easily obtained based thereon. As the position measuring means, there may be used the one based on the recognition of image (focal distance), the laser beam, or the like.

Preferably, the apparatus further comprises: plural kinds of function liquid droplet ejection heads having function liquids to be filled and/or specification which are different from one another; a carriage for mounting thereon the plural kinds of function liquid droplet ejection heads; a head stocker for holding in stock the plural kinds of function liquid droplet ejection heads in a replaceable manner; and a head transfer mechanism for transferring the function liquid droplet ejection heads between the carriage and the head stocker.

According to this arrangement, the function liquid droplet ejection head on the stocker and the function liquid droplet ejection head on the carriage can be replaced, depending on necesscity, by the head transfer mechanism. It is thus possible to eject different function liquids toward the workpiece in a short time. In addition, even if the position of the nozzle surface changes due to the function liquid droplet ejection head to be replaced, the workpiece gap and the water head can be adequately adjusted. Therefore, the ejection of the function liquid from the function liquid droplet ejection head can be adequately performed.

Preferably, the apparatus further comprises: function liquid supply means for independently supplying the plural kinds of function liquid ejection heads with the function liquids. The function liquid supply means comprises a plurality of function liquid tanks corresponding to the plural kinds of function liquid droplet ejection heads, and the plurality of function liquid tanks and the plural kinds of function liquid droplet ejection heads are respectively connected to each other through a tube.

According to this arrangement, since each of the function liquid tanks and each of the function liquid droplet ejection heads are connected to each other by a tube in advance, there is no need of attachment and detachment of the tube at the time of replacement between the stocker and the carriage. As a result, the replacement of the function liquid droplet ejection heads can be performed quickly and the function liquid can be surely prevented from leaking at the time of replacement.

The method of manufacturing an electrooptic device according to this invention is characterized in that, by using the above-described liquid droplet ejection apparatus, a film forming part is formed on the workpiece by means of the function liquid droplet.

Further, the electrooptic device according to this invention is characterized in that a film forming part is formed on the workpiece by means of the function liquid by using the above-described liquid droplet ejection apparatus.

According to the above-described arrangements, since the electrooptic device is manufactured by using the liquid droplet ejection apparatus which is capable of ejecting the function liquid in a various manner, the electrooptic device can be manufactured efficiently. As the electrooptic device, the following can be listed, i.e., a liquid crystal display device, an organic electroluminescence (EL) device, an electron emission device, a plasma display panel (PDP) device, electrophoretic display device, or the like. The electron emission device is a concept inclusive of the so-called field emission display (FED) device and a Surface-Conduction Electron Emitter Display (SED). Further, as the electrooptic device, the following can be listed, i.e., a device for forming metallic wiring, a lens, a resist, an optical diffusion member, or the like.

The electronic device according to this invention is characterized in that it has mounted thereon the above-described electrooptic device.

As the electronic device, the following can be listed, i.e., a mobile telephone, a personal computer, and various electric devices, all of which have mounted thereon a so-called flat panel display.

BRIEF DESCRIPTION OF THE DRAWINGS

The above and other objects and the attendant features of this invention will become readily apparent by reference to the following detailed description when considered in conjunction with the accompanying drawings wherein:

FIG. 1 is an overall perspective view of a liquid droplet ejection apparatus according to an embodiment of this invention;

FIG. 27 is an exploded perspective view showing an important portion of the display device according to the third embodiment of this invention.

DETAILED DESCRIPTION OF THE PREFERRED EMBODIMENTS

Figure 2:
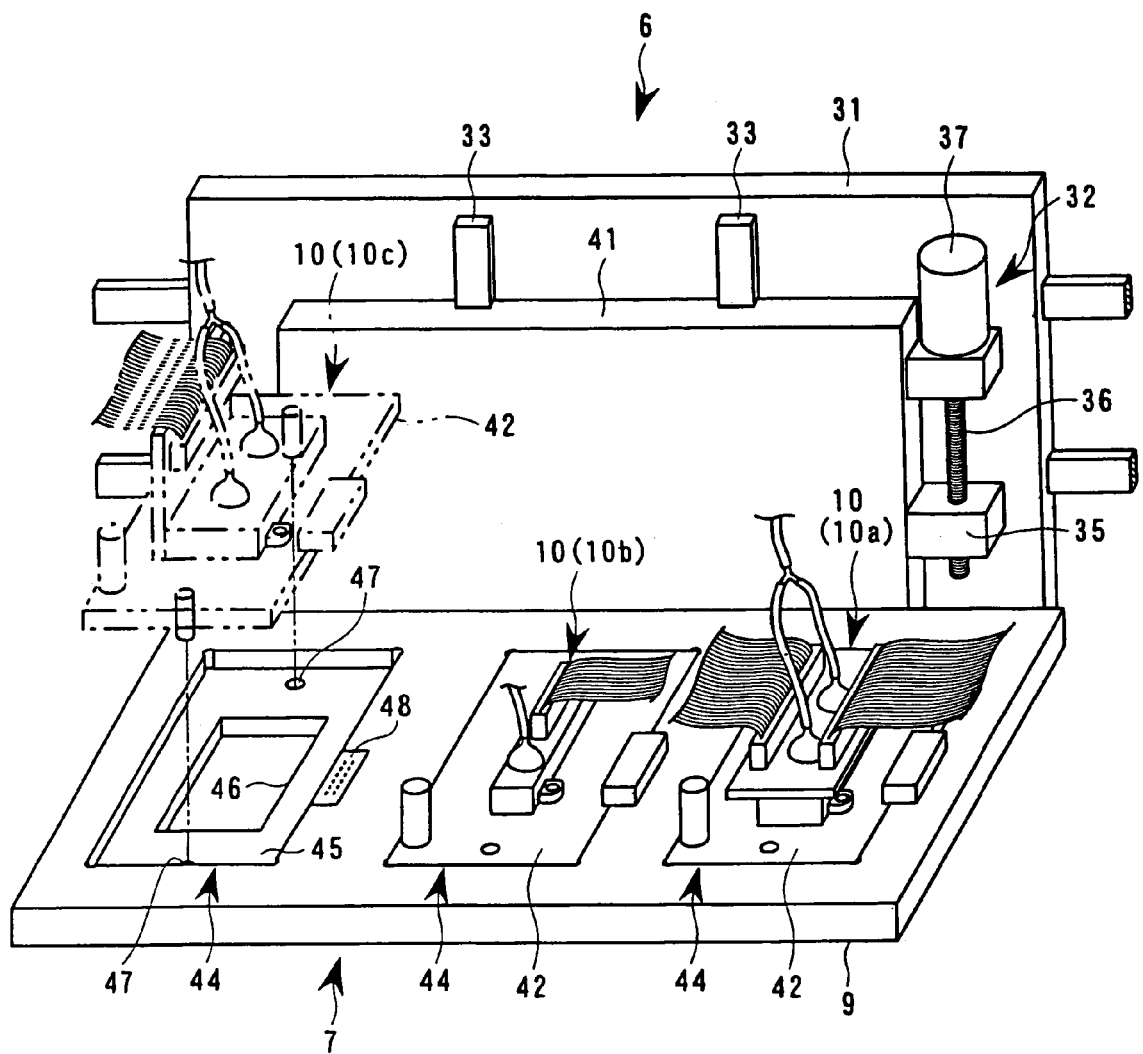
FIG. 2 is an enlarged perspective view around a head unit of the liquid droplet ejection apparatus.

With reference to the accompanying drawings, an explanation will now be made about a liquid droplet ejection apparatus, a method of manufacturing an elctrooptic device, an elctrooptic device, and an electronic device according to this invention.

In the following description, some of the devices, elements, or parts are sometimes referred to in a singular form (e.g., a head) when there are actually more than one in number (i.e., three heads). In such a case, it is to be understood that reference is being made to a representative one out of many partly to simplify the matter.

An ink jet head (a function liquid droplet ejection head) of an ink jet printer is capable of ejecting very fine or minute ink droplets (function liquid droplets) in the form of dots at a high accuracy. Therefore, by using liquid substances such as special inks, light emitting or photosensitive resins as the function liquids (i.e., liquids to be ejected), the art of ink jet printing is expected to be applied to the field of manufacturing various components or constituent parts.

In the liquid droplet ejection apparatus according to this embodiment, plural kinds of function liquid droplet ejection heads with different specifications or with different function liquids to be introduced therein are replaced inside the apparatus depending on the necessity. The function liquids are thus ejected toward a substrate W (i.e., a workpiece) so as to form a desired film-formed part on the substrate (details will be described hereinafter).

As shown in FIG. 1, the liquid ejection apparatus 1 according to this embodiment is made up of: an apparatus base 2; an X-axis table 4 and a Y-axis table 5 which crosses the X-axis table 4 at right angles thereto, both constituting a moving mechanism 3; a main carriage 6 which is mounted on the X-axis table in a movable manner; and a head unit 7 which is mounted on the main carriage 6. The head unit 7 has mounted thereon three kinds of function liquid droplet ejection heads of different specifications in a detachable and replaceable manner through a sub-carriage (carriage) 9. A substrate W which is referred to as a workpiece is mounted on the Y-axis table 5 in a detachable manner.

Near the left side of the X-axis table 4, there is disposed a head stocker 12 for keeping in stock the function liquid droplet ejection heads 10. The illustrated example of the head stocker 12 is so arranged that three kinds of function liquid droplet ejection heads 10 can be held in stock. On the left side of the apparatus base 2 there is vertically disposed a transfer robot 13. A function liquid droplet ejection head 10 on the head stocker 12 and the function liquid droplet ejection head 10 on the sub-carriage 9 can thus be replaced with each other (or transferred for exchanging) by this transfer robot 13.

Near the transfer robot 13, a function liquid supply mechanism (function liquid supply means) 14 is disposed on the apparatus base 2. A function liquid is fed or supplied from this function liquid supply mechanism 14 to each of the function liquid droplet ejection heads 10. A distance measuring device (measuring means) 15 is similarly disposed in a downward-looking posture on the apparatus base 2 near the transfer robot 13. The function liquid droplet ejection apparatus 1 has built therein a control means 16 (see FIG. 9) for performing an overall control over the constituting apparatuses and devices such as the above-described moving mechanism 3, the function liquid droplet ejection heads 10, or the like.

Although not illustrated, the liquid droplet ejection apparatus 1 has built therein: a flushing unit which performs periodical flushing work of the function liquid droplet ejection heads 10 mounted on the head unit 7 (i.e., wasting or throw-away ejection of the function liquid from all of the ejection nozzles); a wiping unit which wipes away the nozzle surfaces of the function liquid droplet ejection heads 10; a suction unit which performs maintenance and suction of the function liquid droplet ejection heads 10; or the like.

The X-axis table 4 has an X-axis slider (sliding member) 21 to be driven by an electric motor 22 which constitutes a driving system in the X-axis direction. This X-axis slider 21 has mounted thereon the above-described main carriage 6 in a movable manner. Similarly, the Y-axis table 5 has a Y-axis slider (sliding member) 23 to be driven by an electric motor 24 which constitutes a driving system in the Y-axis direction. The Y-axis slider 23 has mounted thereon, in a movable manner, a setting table 25 which is made up of a suction table (worktable) 26, a Θ table 27, or the like. The X-axis table 4 is supported by right and left supporting columns 29, 29 which are vertically disposed on the apparatus base 2, and the Y-axis table 5 is directly supported on the apparatus base 2. The substrate W is set in position after due alignment on the suction table 26 of the setting table 25.

The liquid droplet ejection apparatus 1 of this embodiment is constituted such that each of the function liquid droplet ejection heads 10 is driven (i.e., the function liquid droplet is selectively ejected) in a manner synchronized with the movement of each of the function liquid droplet ejection heads 10 by means of the X-axis table 4. The so-called main scanning by the function liquid droplet ejection heads 10 is performed by the back-and-forth movement of the X-axis table 4 in the X-axis direction. Correspondingly, the so-called sub-scanning is performed by a forward movement of the substrate W in the Y-axis direction by means of the Y-axis table 5. The driving of each of the function liquid droplet ejection heads 10 in the above-described scanning is performed based on ejection pattern data which are stored in the control means 16.

As shown in FIG. 2, the main carriage 6 is made up of a slide base 31 which is mounted on the X-axis slider 21 in a vertical posture in a movable manner, and a Z-axis moving mechanism (gap adjusting means) 32 which is built into the slide base 31. The slide base 31 has on its front surface a pair of guide rails 33. The head unit 7 is mounted on the pair of guide rails 33 in a manner slidable in the vertical (up-and-down) direction. The Z-axis moving mechanism 32 is constituted by a female screw member 35 which is disposed on the head unit 7 side, a male screw member 36 which is engaged with the female screw member 35 in a screwed manner, and a stepping motor (actuator) 37 which rotates the male screw member 36 in one direction and in the opposite direction. As a result of rotation of the stepping motor 37 in one direction and in the opposite direction, the head unit 7 is moved up and down so that the workpiece gap between the function liquid droplet ejection head 10 on the head unit 7 and the substrate W can be finely adjusted (details will be described hereinafter).

The head unit 7 has a bracket 41 which is mounted, in a vertical posture, on the slide base 31 in a manner to be slidable, and the sub-carriage 9 which is mounted on the racket 41 in a horizontal posture. Three kinds of function liquid droplet ejection heads 10, 10, 10 are respectively mounted in a detachable manner through the head holding members 42, 42, 42. Though not illustrated, between the bracket 41 and the sub-carriage 9, there is built in a parallelism fine adjusting mechanism which finely adjusts the angle about the X-axis and the Y-axis of the sub-carriage 9.

The sub-carriage 9 is constituted by a thick metallic plate such as of stainless steel and has formed on its surface three head mounting parts 44, 44, 44 arranged in a lateral direction. Each of the head mounting parts 44 is constituted by a shallow-grooved part 45 into which is fit in position the head holding member 42, and a through-going opening 46 which is formed in the center of the shallow-grooved part 45 and through which a bottom portion (head main body 51, see, e.g., FIG. 3) of the function liquid droplet ejection head 10 penetrates. The bottom of the groove in the shallow-grooved part 45 has formed therein a pair of positioning holes (positioning receiving parts) 47, 47 which hold in position the head holding member (function liquid droplet ejection head 10) across the through-going opening 46. Further, a detector 48 for detecting the kind of the function liquid droplet ejection head 10 is buried into the groove edge portion of each of the shallow-grooved parts 45, and the detector 48 is connected to the control means 16.

The three kinds of the function liquid droplet ejection heads 10, 10, 10 are made up of: a first ejection head 10*a* (see FIG. 3) which is mounted on the right portion of the sub-carriage 9; a second ejection head 10*b* (see FIG. 4) which is mounted on an intermediate portion between the right and left of the sub-carriage 9; and a third ejection head 10*c* (see FIG. 5) which is mounted on the left portion of the sub-carriage 9. They are all mounted on the head mounting part 44 of the sub-carriage 9 in a state of being held in position by the head holding member 42. Although not illustrated, the three kinds of the function liquid droplet ejection heads 10, 10, 10 mounted on the sub-carriage 9 in a state of being held in position are positioned such that the outermost ejection nozzles (standard or reference nozzles) on the side of the bracket 41 are arranged on the same position as seen in the Y-axis direction.

Figure 3:
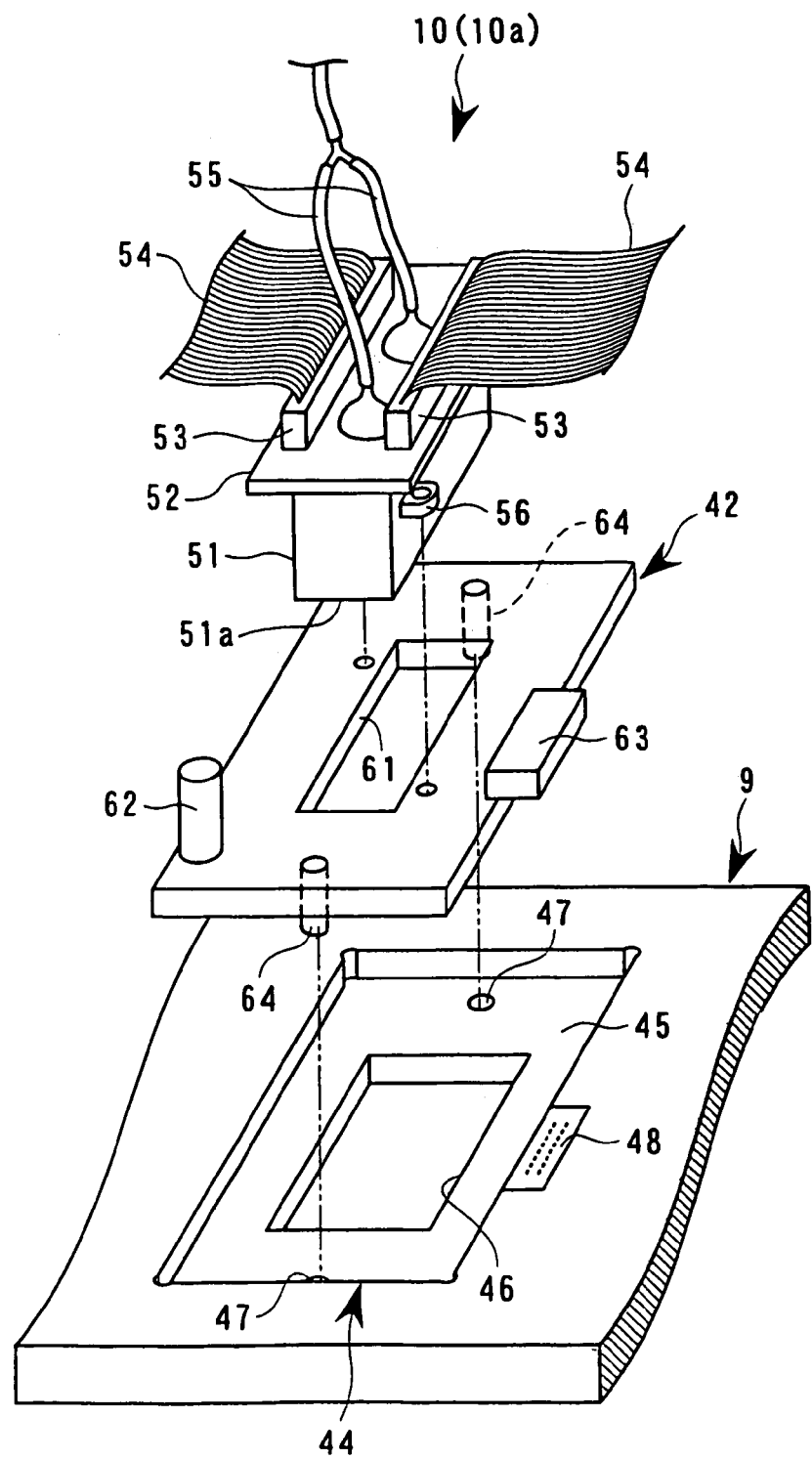
FIG. 3 is an enlarged perspective view around a first ejection head (function liquid droplet ejection head)

The first ejection head 10*a* is designed in a specification for ejecting a very small amount of function liquid of relatively low viscosity from each of the ejection nozzles. In other words, the first ejection head 10*a* is made with a large number of nozzles, with a unit amount of ejection of function liquid per nozzle being small. As shown in FIG. 3, the first ejection head 10*a* is made up of the head main body 51 having two nozzle arrays (not illustrated) on a nozzle surface 51*a*, and a head substrate 52 which is fixed to the upper side of the head main body 51. The head substrate 52 has connected thereto a pair of flexible cables 54, 54 which are in communication with the control means 16 through a pair of connectors 53. The head main body 51 has connected thereto a pair of silicone tubes 55, 55 which are in communication with the function liquid supply mechanism 14 by penetrating or passing through the head substrate 52.

A mounting boss 56 is provided on respective sides of the head main body 51 in a manner to project sidewise. The first ejection head 10*a* is fixed by screwing with these mounting bosses 56, 56 to the head holding member 42 in a state in which the head main body 51 is positioned by insertion into a mounting hole 61 in the head holding member 42.

The head holding member 42 is made of a rectangular member such as of a stainless steel in which is formed the mounting hole 61 in the center thereof, and is formed in a thickness which is substantially equal to the depth of the shallow-grooved part 45 (head mounting part 44) of the sub-carriage 9. A columnar holding projection (holding part) 62 is vertically disposed in a corner of this side (the side of the reader as seen in FIG. 3) on the upper surface of the head holding member 42. On the lower surface of the head holding member 42, there are disposed, in a manner to project downward, a pair of positioning pins (positioning parts) 64, 64 which correspond to the above-described positioning holes 47, 47 with the mounting hole 61 therebetween.

The head holding member 42 having mounted thereon the function liquid droplet ejection head 10 (first ejection head 10*a*) is held by the transfer robot 13 at the holding projection 62, and is mounted from the upper side onto the head mounting part 44 of the sub-carriage 9. In mounting, the pair of the positioning pins 64, 64 of the head holding member 42 are aligned and guided into the pair of the positioning holes 47, 47 of the head mounting member 44, whereby the head holding member 42 is mounted onto the sub-carriage 9. It may alternatively be so arranged that, contrary to the above-described construction, the positioning pins 64 are disposed in the head mounting portion and the positioning holes 47 are formed in the head holding member 42.

In a state in which the head holding member 42 is mounted on the sub-carriage 9, the surface (upper surface) of the head holding member 42 and the surface (upper surface) of the sub-carriage 9 become flush with each other (i.e., on the same level). In addition, the head main body 51 of the function liquid droplet ejection head 10 slightly projects out of the mounting hole 61 in the sub-carriage 9. An element 63 to be detected (referred to as a detected element) of the head holding member 42 comes into contact with the detector 48 of the sub-carriage 9, whereby the kind of the function liquid droplet ejection head 10 is detected.

Although not illustrated, an engaging projection is built, in a manner to be freely projected and depressed, into the peripheral portion of the head holding member 42 at two points which are in point-symmetry with each other. When the transfer robot 13 releases the grabbing of the holding projection 62, this engaging projection comes into engagement with the peripheral portion of the shallow-grooved part 45. It is thus so arranged that the head holding member 42 is fixed to (or prevented from being pulled out of position of) the head mounting part 44. In other words, locking and unlocking mechanism of the head holding member (function liquid droplet ejection head) 42 relative to the sub-carriage 9 is constituted by: the operating part which is built into the holding projection 62; the engaging projections which are built into the head holding member 42; and the engaging groove which is formed in the head mounting part 44. Similar arrangement is employed also in a stocking table 71 which is described in detail hereinafter.

Figure 4:
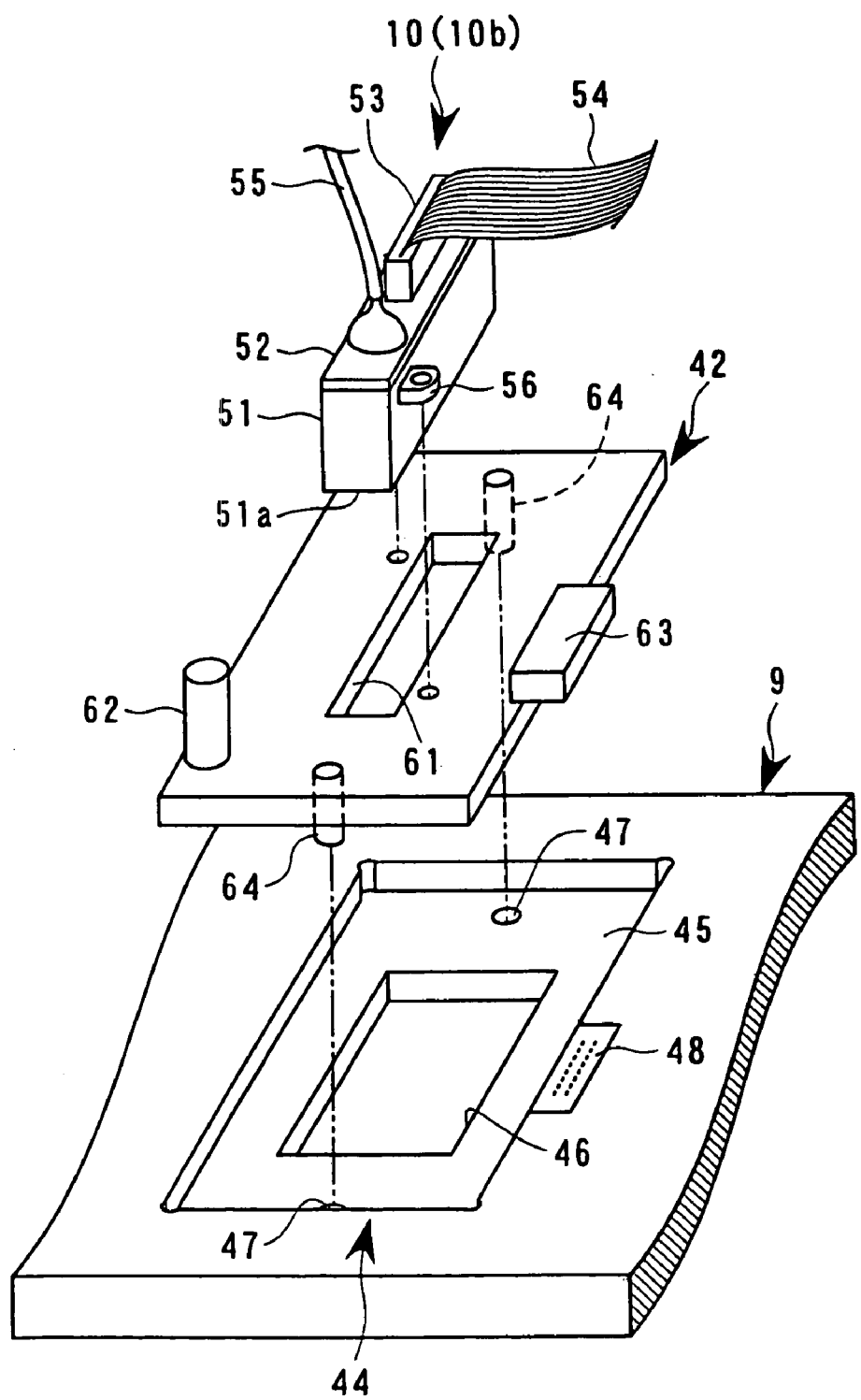
FIG. 4 is an enlarged perspective view around a second ejection head (function liquid droplet ejection head)

The second ejection head 10b is designed in a specification of ejecting a large amount of function liquid of relatively higher viscosity from each of the nozzles. In other words, the nozzles are extremely small in number and the unit amount of ejecting the function liquid droplet per nozzle is extremely large. As shown in FIG. 4, the second ejection head 10b is made up of a head main body 51 having a single array of nozzles (not illustrated) on the nozzle surface 51a, and a head substrate 52 which is fixed to the upper side of the head main body 51. The head substrate 52 has connected thereto a flat flexible cable 54 through a connector 53. The head main body 51 has connected thereto a silicone tube 55.

Like in the above-described case, the second ejection head 10b is also mounted on the head holding member 42 which has a pair of positioning pins 64, 64, a holding projection 62, and a detected element 63. In this state, the second ejection head 10b is detachably mounted on the head mounting part 44 of the sub-carriage 9.

Figure 5:
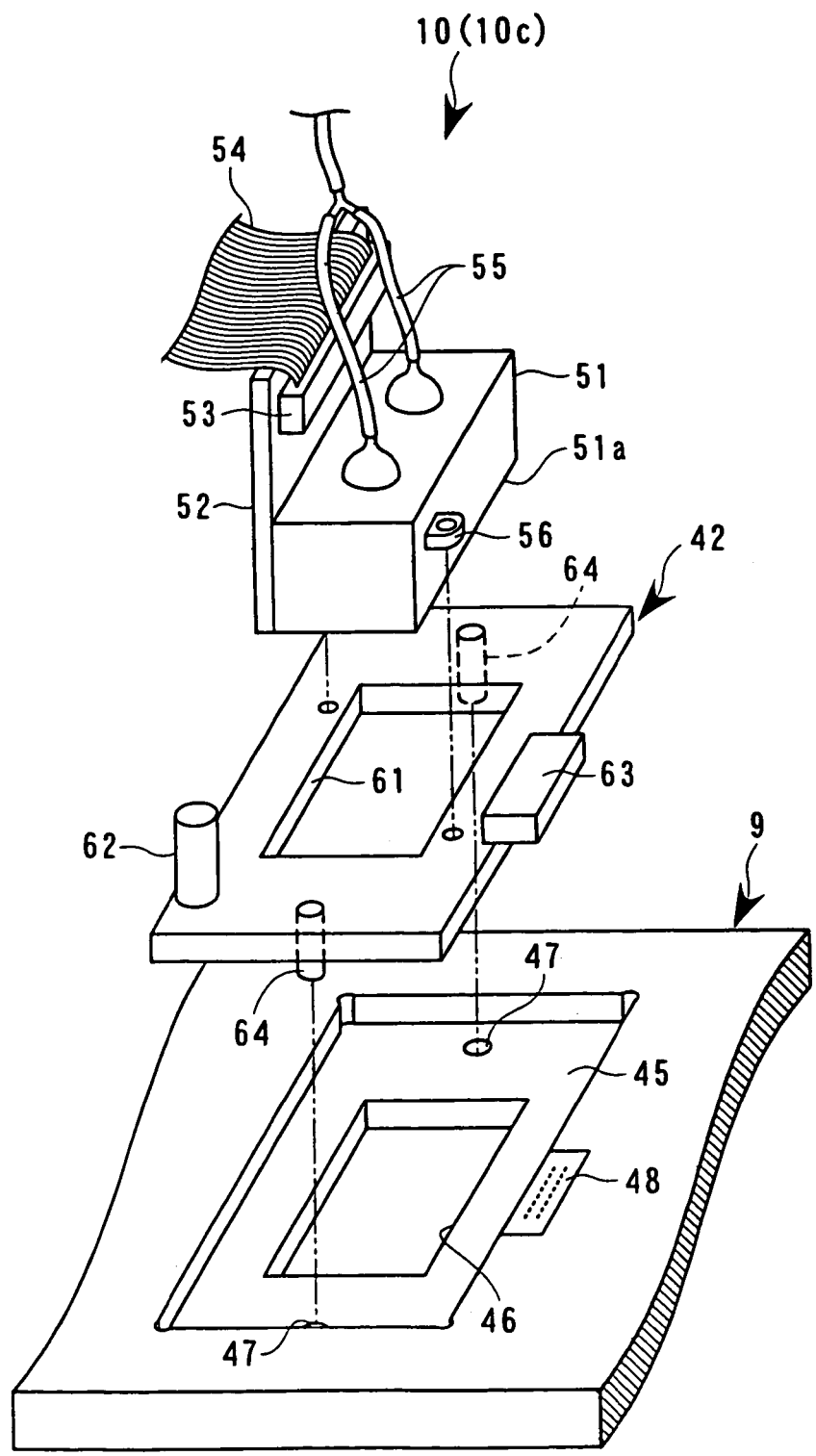
FIG. 5 is an enlarged perspective view around a third ejection head (function liquid droplet ejection head)

The third ejection head 10c is designed in a specification of ejecting a large amount of function liquid of relatively high viscosity. In other words, the nozzles are relatively large in number, and the unit amount of ejecting the function liquid is intermediate in quantity. As shown in FIG. 5, the third ejection nozzle head 10c is made up of a head main body 51 which has a single array of nozzles (not illustrated) on the nozzle surface 51a, and a head substrate 52 which is fixed to the upper surface of the head main body 51. The head substrate 52 has connected thereto a flexible cable 54 through a connector, and the head main body 51 has connected thereto silicone tubes 55.

Like in the above-described case, the third ejection head 10c is also mounted on the head holding member 42 which has a pair of positioning pins 64, 64, a holding projection 62, and a detected element 63. In this state, the third ejection head 10c is detachably mounted on the head mounting part 44 of the sub-carriage 9. In other words, the three head holding members 42, 42, 42 have otherwise the same construction except for the fact that the mounting hole 61 and therearound are different from one another so as to suit each of the function liquid droplet ejection heads 10 (10a, 10b, 10c).

The distance measuring device 15 is to measure the position of the surface of the substrate W as well as the position of the surface of the suction table 26. By utilizing reflected laser light, each of the above-described positions is measured at a high accuracy. The results of these measurements are outputted to the control means 16, which then computes the thickness of the substrate W. Based on the thickness of the substrate W and the positional data of the sub-carriage 9 (function liquid droplet ejection head 10) and the suction table 26, the workpiece gap is computed. Based on the result of this computation, fine adjustment of the workpiece gap as well as fine adjustment in height of a sub-tank 142 which is described later are performed. This fine adjustments will be described in detail hereinafter. In other word, the distance measuring device (measuring means) 15 and the control means (computing means) 16 constitute the gap measuring means.

Figure 6:
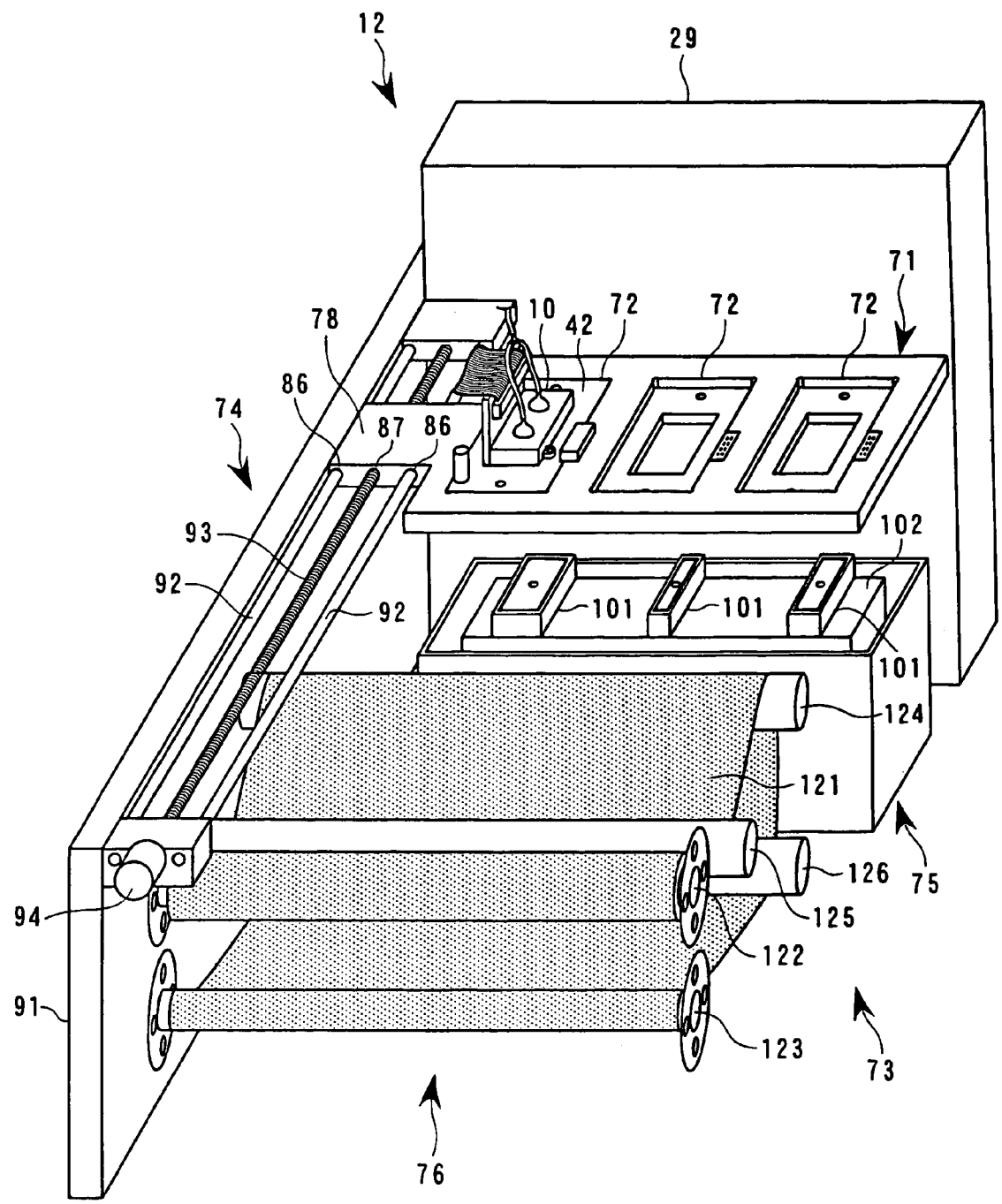
FIG. 6 is a perspective view around a head stocker of the liquid droplet ejection apparatus.
Figure 7:
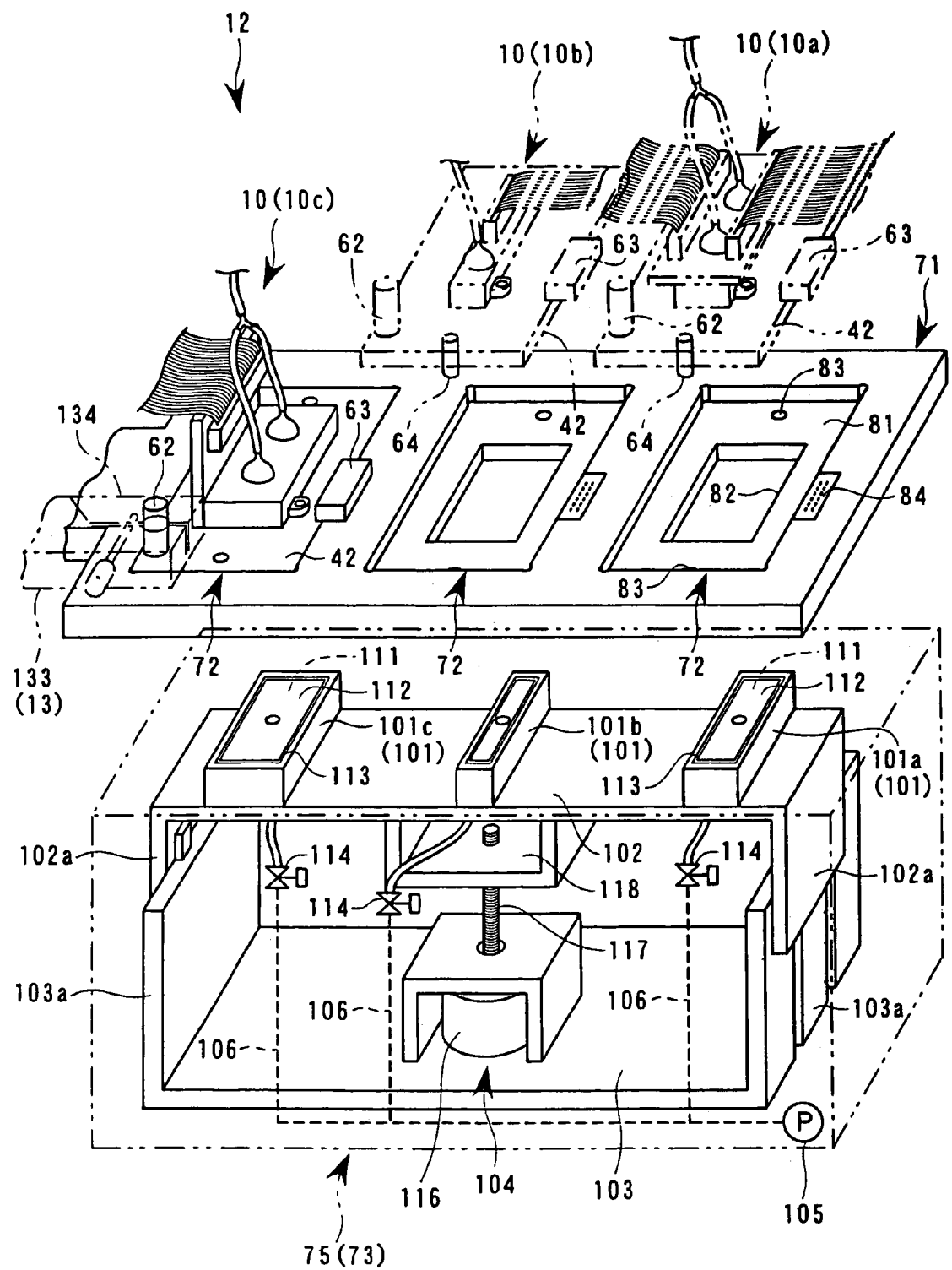
FIG. 7 is an enlarged perspective view around a stocking table and a cap unit of the head stocker.

As shown in FIGS. 6 and 7, the head stocker 12 is disposed to face the supporting column 29 on the left side, and is made up of: a stocking table 71 which forms a head mounting part 72 on which is set in position the function liquid droplet ejection head 10; a head maintenance mechanism 73 which is disposed on the lower side of the stocking table 71; and a horizontal moving mechanism 74 which moves the stocking table 71 in a horizontal posture. In FIGS. 1 and 6, only one horizontal moving mechanism 74 is illustrated for convenience of explanation. Actually, one horizontal moving mechanism 74 may be disposed on both right and left sides of the stocking table 71 so as to secure horizontal accuracy and stability. The head maintenance mechanism 73 is made up of: a cap unit 75 which has a dual function as a flushing unit and as a suction unit; and a wiping unit 76 which wipes the nozzle surface 51a.

The stocking table 71 has substantially the same arrangement as the above-described sub-carriage 9. What is different therefrom is that there are provided three head mounting parts 72 to serve as the stocking part which is disposed so as to extend on a side (on the left side). Each of the head mounting parts 72 is made up of a shallow-grooved part 81 and a through-going opening 82, and has a pair of positioning holes 83, 83 and a detector 84. A plate supporting part 78 has formed therein a pair of guide holes 86, 86 through which a pair of guide rods 92, 92 are inserted, as well as a screwed hole 87 through which a male screw 93 (ball screw) is engaged in a screwed manner.

The stocking table 71 is disposed on substantially the same height as the above-described sub-carriage 9. It is so arranged that the nozzle surface 51a of the function liquid droplet ejection head 10 mounted on the stocking table 71 becomes substantially on the same level as the nozzle surface 51a of the function liquid droplet ejection head 10 mounted on the sub-carriage 9. The stocking table 71 is positioned right above the cap unit 75 of the head maintenance mechanism 73 when the stocking table 71 is in a home position of having returned to the side of the supporting column 29. The stocking table 71 moves back and forth in the Y-axis direction by the horizontal moving mechanism 74 between a position of facing the cap unit 75 and the position of facing the wiping unit 76.

The horizontal moving mechanism 74 is made up of: the pair of guide rods 92, 92 which are horizontally supported at both the front and rear end portions of an apparatus frame 91; the male screw 93 which is disposed between both the guide rods 92, 92; and an electric motor 94 for the stocking part, the motor being connected to one end of the male screw 93. As described above, the plate supporting part 78 of the stocking table 71 is slidably inserted through the pair of guide rods 92, 92, and a screwed hole 87 in the plate supporting part 78 is engaged in a screwed manner with the male screw 93. Therefore, when the electric motor 94 for the stocking part is rotated in one direction and in the opposite direction, the stocking table 71 moves horizontally guided by the pair of guide rods 92, 92 by means of the screw mechanism constituted by the male screw 93 and the screwed hole 87. The stocking table 71 thus moves back and forth between the cap unit 75 and the wiping unit 76. During this forward movement of this stocking table 71, the function liquid droplet ejection head 10 mounted (or held in stock) on the stocking table 71 is subjected to the wiping operation. The wiping mechanism is thus constituted by the wiping unit 76 and the horizontal moving mechanism 74.

As shown in FIG. 7, the cap unit 75 is made up of: three head caps 101 of a first head cap 101a, a second head cap 101b, and a third head cap 101c respectively corresponding to the three kinds (10a, 10b, 10c) of the function liquid droplet ejection heads 10; a cap base 102 which supports these head caps 101; a supporting frame 103 which supports the cap base 102 in a manner to be slidable in the vertical (up-and-down) direction; and a vertical movement mechanism 104 which moves the three kinds of head caps 101 in the vertical direction through the cap base 102. The cap unit 75 is provided with a suction pump (suction means) 105 which is connected to each of the head caps 101 through a suction tube 106. In order to be prepared for the case in which the three function liquid droplet ejection heads are mounted at the same time, or in which one or two thereof are mounted, the maintenance mechanism may be arranged as follows. Namely, the cap, the back-and-forth movement mechanism and the suction pump (suction means) for the cap, as well as the wiping unit may be arranged for each of the function liquid droplet ejection heads. Only one of the cap, the back-and-forth movement mechanism and the suction pump (suction means) for the cap, as well as the wiping unit may also be used in common for the three sets.

The head cap 101 is filled in a recessed function liquid stay (i.e., a place where the liquid collects) 111 with a function liquid suction material 112, and has a sealing packing 113 on the periphery of the liquid stay 111. By thus bringing the sealing packing 113 into close contact with the nozzle surface 51a of the function liquid droplet ejection head 10, all of the ejection nozzles can be sealed. The function liquid stay 111 has connected thereto the suction tube 106 which has interposed therein a gate valve (solenoid valve) 114. In case the function liquid in the function liquid droplet ejection head 10 is sucked by the suction pump 105 through the head cap 101, only the relevant gate valve 114 is opened.

The cap base 102 is formed into an inverted (or downward-looking) U-shape and is slidably supported by side frames 103a, 103a on both sides of the supporting frame 103 which is formed in an upward-looking U-shape. The vertical movement mechanism 104, on the other hand, is made up of: a vertical moving electric motor 116 which is fixed to the center of the supporting frame 103; a male screw 117 which is connected to the vertical moving electric motor 116; and a bracket 118 with a female screw (also referred to as a female screwed bracket), the bracket being engaged with the male screw in a screwed manner and being fixed to the lower surface of the cap base 102. As a result of rotation of the vertical moving electric motor 116 in one direction and in the opposite direction, the cap base 102 is moved up and down through the male screw 117 and the female screwed bracket 118.

In this arrangement, when the head cap 101 is brought into close contact with the function liquid droplet ejection head 10 held in stock by the vertical movement mechanism 104, the nozzle surface 51a of the function liquid droplet ejection head 10 can be sealed, whereby the function liquid can be prevented from drying (this operation is also referred to as "capping"). Further, with respect to the function liquid droplet ejection head 10 right before replacement, the function liquid can be sucked by the suction pump 105, whereby the suction of all of the ejection nozzles can be performed. In addition, after the sucking operation, the nozzle surface is cleaned by means of the wiping unit (this operation is also referred to as "wiping"). If, on the other hand, blank ejection (i.e., ejection not for image forming purpose) is made from all of the ejection nozzles while keeping the head caps 101 slightly apart from the nozzle surfaces 51a, the so-called flushing (blank ejection or preliminary ejection) can be performed. In other words, each of the head caps 101 in this embodiment also serves the function of blank ejection (blank shot) receiver which receives the blank ejection of the function liquid droplet ejection heads 10. At the time of flushing operation, the head caps 101 are slightly lowered from the nozzle surfaces 51a in order to prevent the function liquid from splashing (or scattering). At the time of standing by such as when the stocking table 71 is moved or the like, it is preferable to arrange that the head caps 101 can be sufficiently lowered (i.e., to enable the head caps to lower by two different steps).

The wiping unit 76 is to wipe away, with a wiping sheet such as non-woven fabric containing therein a solvent, the function liquid which may have adhered to the nozzle surfaces 51a of the function liquid droplet ejection heads 10 as a result of the above-described suction of the function liquid. As shown in FIG. 6, the wiping unit 76 is made up of: a delivery reel 122 around which is rolled the wiping sheet 121; a take-up reel 123 which takes up the wiping sheet; a wiping roller 124 which pushes the wiping sheet 121 against the function liquid droplet ejection head 10; a first intermediate roller 125 which is disposed between the delivery reel 122 and the wiping roller 24; and a second intermediate roller 126 which is disposed between the wiping roller 124 and the take-up reel 123. An electric motor which serves as the driving source, a supporting frame, or the like, are not illustrated.

As a result of driving rotation of the take-up reel 123 and the braking rotation of the take-up reel 122, the wiping sheet starts its traveling (or movement) in a stretched state. Then, in a manner synchronized with the traveling operation, the horizontal movement mechanism 74 moves back and forth the stocking table 71 on which is mounted the function liquid droplet ejection head 10. As a result, the nozzle surface 51a of the function liquid droplet ejection head 10 comes into contact with the traveling wiping sheet 121 from the front end side to the rear end side as seen in the forward movement direction, whereby the function liquid can be wiped away. Although not illustrated, there is provided a mechanism to slightly move up and down the entire wiping unit 76 or the wiping roller 124. At the time of backward movement of the function liquid droplet ejection head 10, the wiping sheet 121 is prevented from coming into contact with the function liquid droplet ejection head 10.

As described above, the head maintenance mechanism 73 maintains, prior to use, all of the ejection nozzles of the function liquid droplet ejection head 10 held in stock so that they function well. In the head maintenance mechanism 73, the wiping unit 76 and the cleaning mechanism of the cap unit 75 may be omitted (i.e., the suction pump 105 may be omitted). In addition, the exclusively used blank ejection receiver may also be provided aside from the cap 55.

The transfer robot 13 is made up of: a robot main body 131 which is vertically disposed on the apparatus frame 2; a robot arm 132 which is disposed on an upper part of the robot main body 131; and a robot hand 133 which is attached to a front end of the robot arm 132. At a front end portion of the robot hand 133, there is built in a chuck mechanism 134 which holds in a sandwiching manner a holding projection 62 of the head holding member 42 (see FIG. 7). The holding operation by this robot hand 133 and the moving (or transferring) operation by the robot arm 132 are controlled by the control means 16.

In a standard head replacing operation by the transfer robot 13, that function liquid droplet ejection head 10 on the sub-carriage 9 which is to be replaced is first held, and it is then transferred to a free or empty head apparatus part 72 of the stocking table 71. Then, that function liquid droplet ejection head 10 on the stocking table 71 which is to be replaced is held, and is transferred to the head apparatus part 44 which is to be replaced. In this embodiment, out of the three kinds of function liquid droplet ejection heads 10, two are arranged to be mounted on the sub-carriage 9 and one is arranged to be mounted on the stocking table 71. However, the total number of the function liquid droplet ejection heads 10 and the number to be mounted on the sub-carriage 9 and on the stocking table 71 are not limited to those in this embodiment, but maybe varied depending on the necessity.

Figure 8:
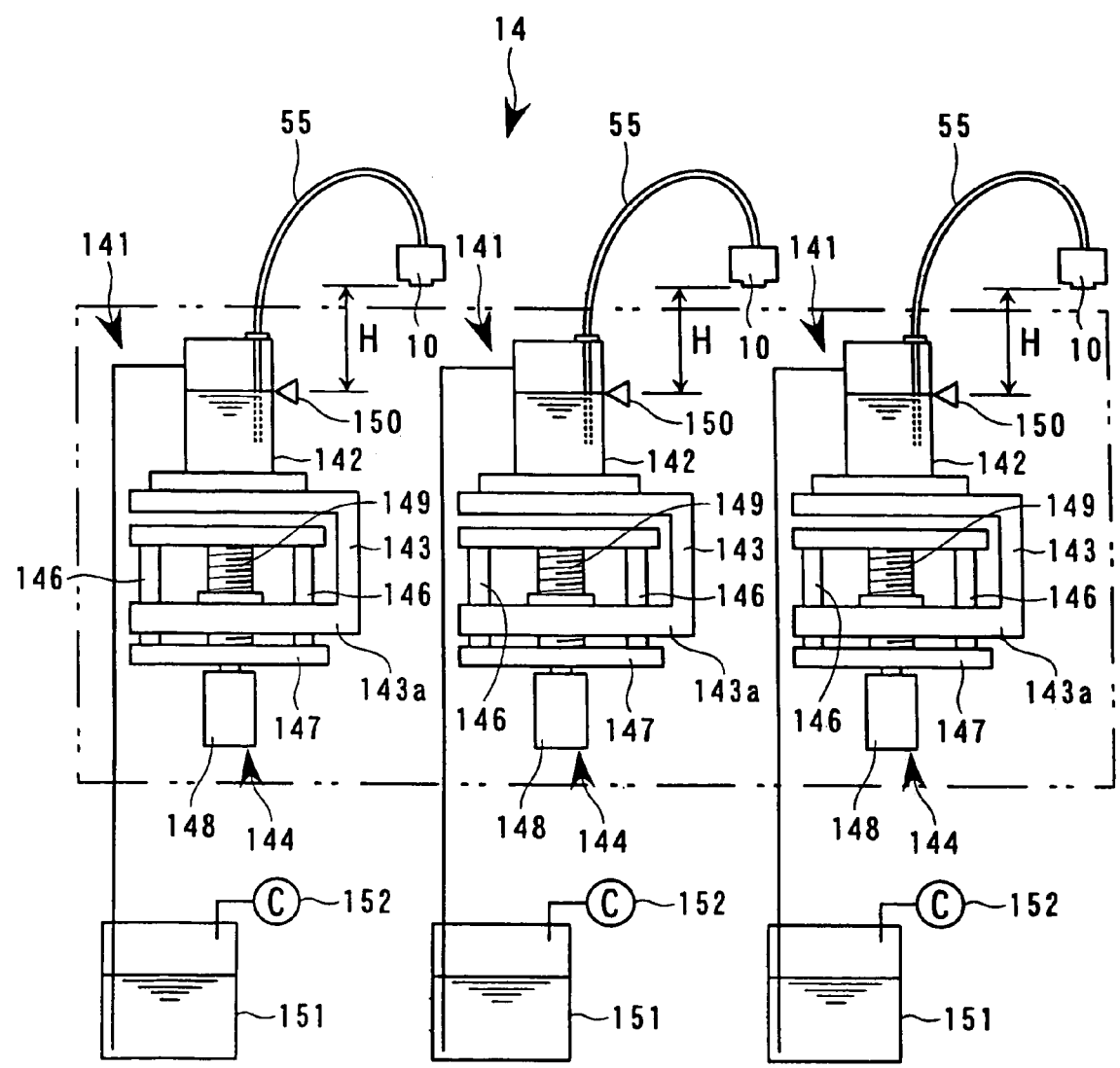
FIG. 8 is a side view of the function liquid supply mechanism of the ejection liquid droplet ejection apparatus.

As shown in FIG. 8, the function liquid supply mechanism 14 is provided with: three sets of tank units 141, 141, 141 each having a sub-tank 142 which serves as a function liquid tank; three kinds of main tanks 151 each of which is connected to the respective sub-tank 142; and a liquid delivery device 152 which delivers the function liquid under pressure to the corresponding sub-tank 142 (this device 152 is also referred to as a "liquid delivery device 152 under pressure"). In other words, the main tank 151 and the liquid delivery device 152 under pressure constitute a function liquid supply means which supplies the sub-tank 142 with the function liquid. The function liquid that has been delivered from each of the main tanks 151 by the liquid delivery device 152 under pressure is stored in the respective sub-tank 142.

Each of the tank units 141 is made up of: the sub-tank 142; a tank holder 143 which holds the sub-tank 142 in a manner to be movable up and down; and a vertical movement mechanism (water-head adjusting means) 144 which moves the sub-tank 142 up and down. The vertical movement mechanism 144 is made up of: a pair of vertical movement guides 146, 146 which hold the tank holder 143 of substantially ⊃-shape in cross section at its lower plate portion 143a so as to be movable up and down; a supporting guide member 147 in which are built the pair of vertical movement guides 146, 146; a vertical movement electric motor (actuator) 148 which is fixed to the lower surface of the supporting guide member 147; and a male screw 149 which is coupled to the vertical movement electric motor 148 and which is engaged in a screwed manner with the lower plate portion 143a of the tank holder 143.

As a result of rotation in one direction and in the opposite direction of the vertical movement electric motor 148, the sub-tank 142 moves up and down through the tank holder 143. In other words, the sub-tank 142 moves up and down by means of the vertical movement mechanism 144, so that the water head H between the sub-tank 142 and the function liquid droplet ejection head 10 can be adjusted (details will be described hereinafter).

The above-described liquid delivery device 152 under pressure is also controlled by the above-described control means 16. In other words, each of the sub-tanks 142 is provided with a liquid level (water level) sensor 150, and the liquid delivery by the liquid delivery device 152 under pressure is controlled so as to keep the liquid level constant.

It is, of course, possible to omit the main tank 151 in case the amount of consumption of the function liquid is small. In such an arrangement, the vertical movement mechanism 144 is controlled such that the liquid level in the sub-tank 142 becomes constant based on the result of detection by the liquid level sensor 150, and is also controlled such that the water head H reaches a certain value based on the result of measurement by the above-described distance measuring device 15.

Each of the sub-tanks 142 and each of the head units 7 (each of the function liquid droplet ejection heads 10) are connected to each other by means of the silicone tube 55. The silicone tube 55 is supported (not illustrated) at its intermediate portion from above so as to enable the silicone tube 55 to follow the head unit 7 which is moved by the moving mechanism 3 and the transfer robot 13. Similarly, each of head drivers 188 (to be described hereinafter) and each of the head units 7 are normally connected to each other by means of the above-described flat flexible cable 54. In other words, in the function liquid droplet ejection head 10 of this embodiment, the silicone tube 55 and the flat flexible cable 54 are not subjected to the operation of connection/disconnection when replaced (transferred). It is, however, possible to arrange them by suing a so-called one-touch or quick-operated tube coupling and connector so as to enable their connection/disconnection.

Figure 9:
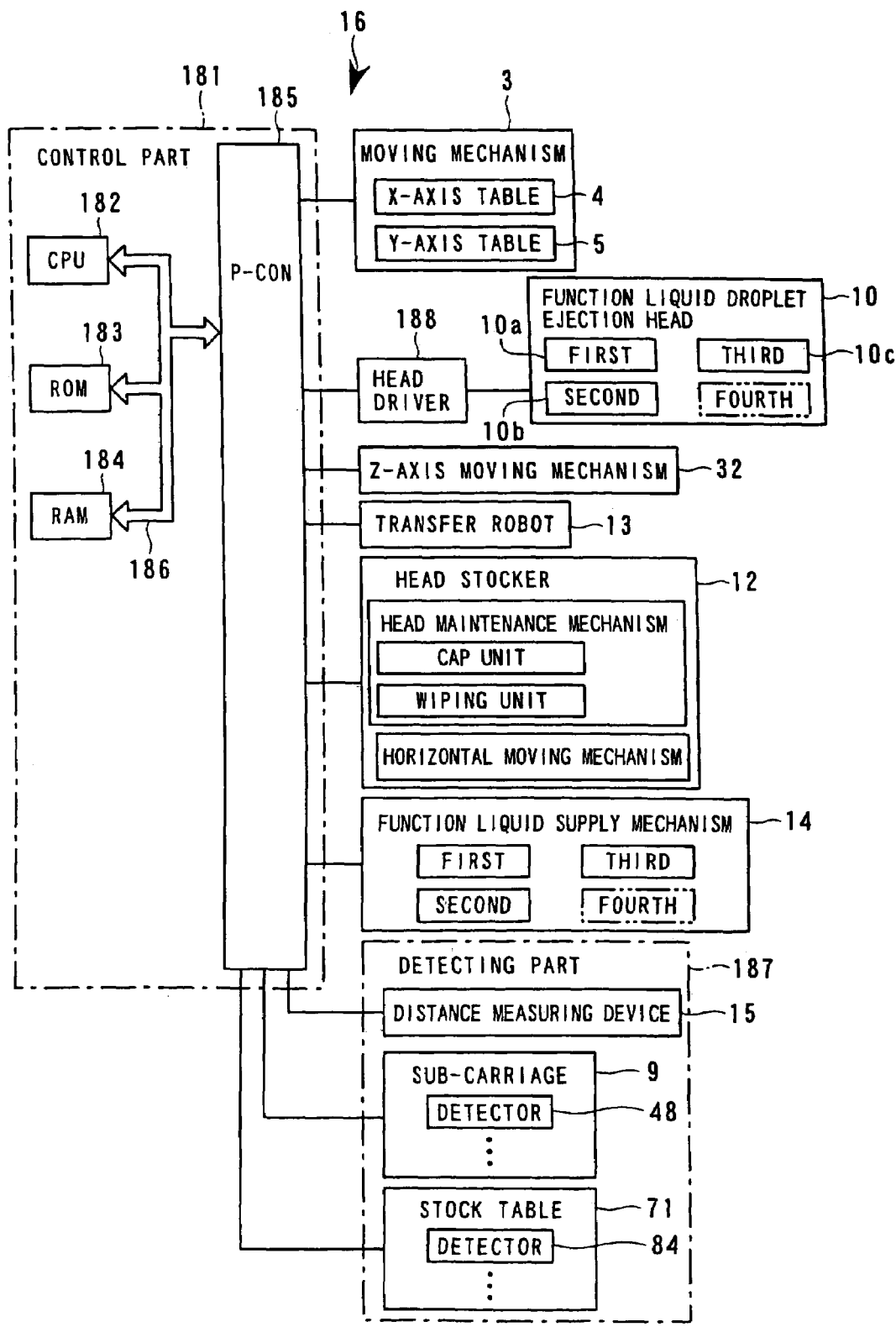
FIG. 9 is a block diagram showing the control means of the liquid droplet ejection apparatus.

As shown in FIG. 9, the control means 16 is provided with a control part 181 which controls various operations of the liquid droplet ejection apparatus 1. The control part 181 is provided with a central processing unit (CPU) 182, a read-only memory (ROM) 183, a random access memory (RAM) 184, and an interface 185, each being connected to one another by means of a bus 186. The ROM 183 has a region in which the control program and control data to be processed in the CPU 182 are stored. The RAM 184 is used as various operating regions for control processing. The interface 185 has built therein a logic circuit which supplements the function of the CPU 182 and also handles the interface signals with the peripheral circuits.

The interface 185 has connected thereto the above-described moving mechanism 3, the function liquid droplet ejection head (head driver 188) 10, the Z-axis moving mechanism 32, the transfer robot 13, the head stocker 12, and the function liquid supply mechanism 14. The interface 185 has further connected thereto, as a detecting part 187, the distance measuring device 15, various detectors 48 of the sub-carriage 9, and various detectors 84 of the stocking table 71. According to the control program inside the ROM 183, the CPU 182 inputs various detected signals, various commands, various data through the interface 185 to thereby control various data (ejection pattern data), or the like, inside the RAM 184 and outputs the various control signals through the interface 185.

In other words, the CPU 182 controls the ejection driving of plural kinds of function liquid droplet ejection heads 10 through the head driver 188, and also controls the moving operations of the X-axis table 4 and the Y-axis table 6 of the moving mechanism 3 through various drivers. In addition, accompanied by the replacement of the function liquid droplet head 10, the CPU 182 controls the transfer robot 13 and also controls the cap unit 75, the wiping unit 76, or the like, of the head maintenance mechanism 73. Further, based on the result of measurement by the distance measuring deice 15, the CPU 182 controls the workpiece gap through the Z-axis moving mechanism 32, and also performs the fine adjustment of the water head H between the sub-tank 142 of the function liquid supply mechanism 14 and the function liquid droplet ejection head 10.

In the basic operation of the liquid droplet ejection apparatus 1 based on the ejection pattern data, the function liquid droplet ejection head 10 is driven by the X-axis table 4 while moving the function liquid droplet ejection head 10 back and forth (main scanning) in the X-axis direction, whereby the function liquid droplet is selectively ejected, and is also driven by the Y-axis table 5 while moving the substrate W forward (in one direction) in the Y-axis direction (sub-scanning). In case a function liquid droplet ejection head 10 is replaced, the head unit 7 is moved in advance to the home position, and the function liquid droplet ejection head 10 on the sub-carriage 9 is transferred by the transfer robot 13 to the stocking table 71 and, thereafter, another function liquid droplet ejection head 10 on the stocking table 71 is transferred to the sub-carriage 9.

On the other hand, the function liquid droplet ejection head 10 mounted on the sub-carriage 9 is subjected to the recognition by the detector 48 provided in the head mounting part 44 as to its mounting and the kind of the head, as well as the nozzle position. The result of this recognition is added to the ejection pattern. Similarly, in the stocking table 71, the fact of mounting of, as well as the kind of, the function liquid droplet ejection head 10 are recognized by the detector 84 provided in the head mounting part 72. Based on this result of recognition, the flushing, the suction of the function liquid, or the like, are controlled. The detecting means which is made up of the detected element 63 and the detector 48, 84 may be arranged to be the one using mechanical switching and sensors, or the one in which IC tips are buried in the detected element 63.

Figure 10A:
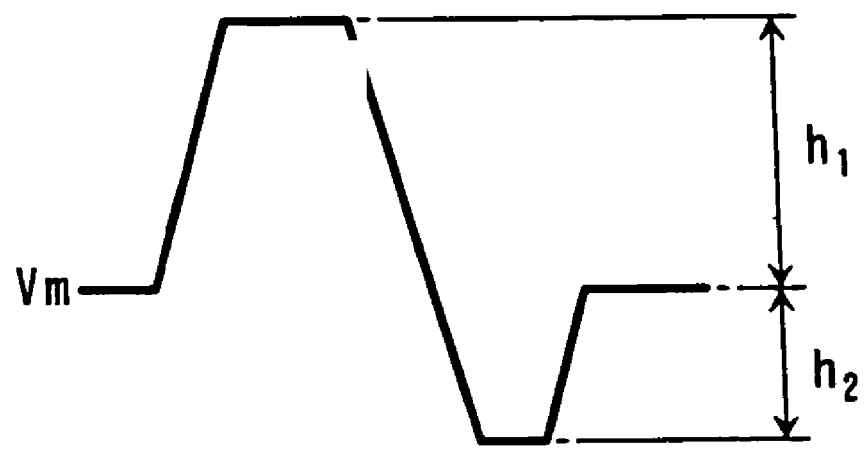
FIG. 10A is an ejection waveform and FIG. 10B is a fine-vibration waveform to be charged to the function liquid droplet ejection head.
Figure 10B:
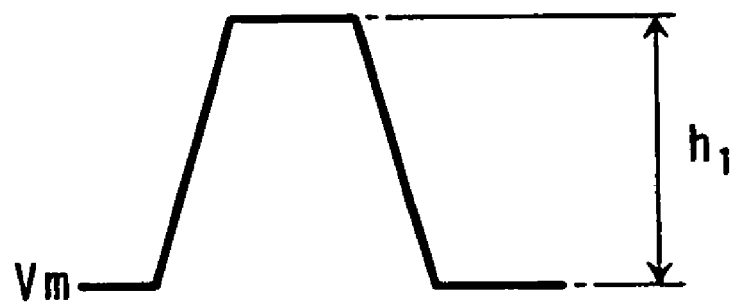

Regarding the function liquid droplet ejection head 10 held in stock on the head stocker 12, aside from the above-described maintenance operation of the capping, it is arranged to charge a driving waveform which is not accompanied by the function liquid ejection, to thereby restrict the increase in the viscosity in the function liquid at the ejection nozzle. As shown in FIGS. 10A and 10B, there are prepared in this embodiment an ejection waveform which accompanies the liquid ejection (see FIG. 10A), as well as a fine-vibration waveform which does not accompany the liquid ejection (see FIG. 10B). It is thus so arranged that the fine-vibration waveform is appropriately charged to the function liquid droplet ejection head 10 on the head stocker 12. In this ejection waveform which accompanies the liquid ejection, a waveform made up of a maximum electric potential which is higher then an intermediate voltage Vm by h1 and a minimum electric potential which is lower by h2 are charged to a piezoelectric element of the function liquid droplet ejection head 10. In the fine-vibration waveform, on the other hand, a waveform made up only of a maximum electric potential which is higher than the intermediate voltage Vm by h1 is charged to the piezoelectric element.

Figure 11:
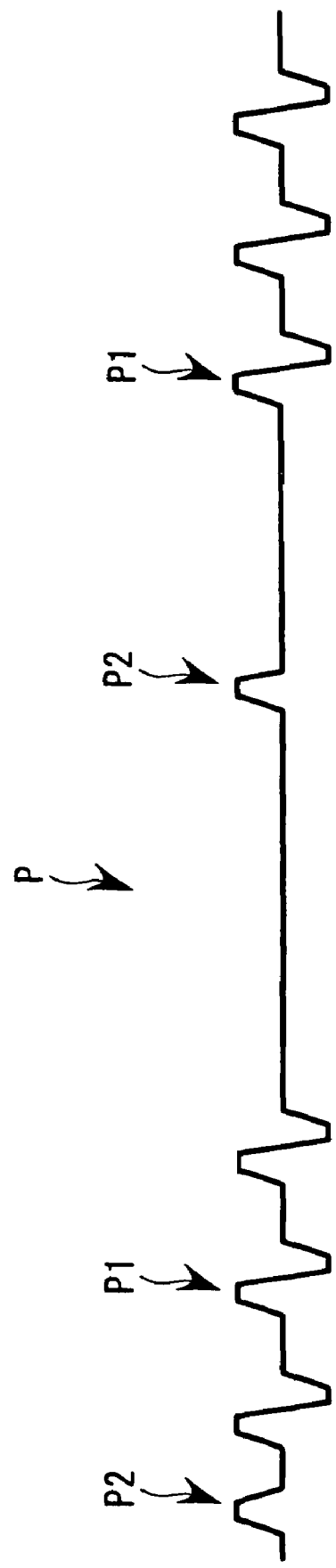
FIG. 11 is a diagram showing a driving pulse for driving the function liquid droplet ejection head.

Alternatively, it may be so arranged that the fine-vibration waveform P2 is charged to that ejection nozzle of the function liquid droplet ejection apparatus 10 which is mounted on the sub-carriage 9 and which is not accompanied by the real ejection, the charging being made at the ejection timing of the real ejection. For example, as shown in FIG. 11, in the ejection timing (driving pulse) of the full ejection, a fine-vibration waveform P2 is charged at the time when the real ejection is not performed. In this manner, the ejection waveform P1 and the fine-vibration waveform P2 are arranged to be present in mixture within the driving pulse P.

It is necessary to perform maintenance, inclusive of prevention of increase in viscosity of the liquid, on the ejection nozzle of the function liquid droplet ejection head 10 held in stock. Therefore, as described above, the function liquid droplet ejection head 10 transferred to the head stocker 12 is appropriately subjected to the capping, suction, flushing and wiping by using the head maintenance mechanism 73 and the horizontal moving mechanism 74.

On the other hand, at the time of replacement of the substrate W, the surface position of the substrate W and the surface position of the suction table 26 are measured by the distance measuring device 15. Based on the data of this measurement, the thickness of the substrate W is computed by the control part 181, and the Z-axis moving mechanism 32 is driven so that the workpiece gap becomes an appropriate value. In other words, at the time of replacement of the workpiece W, the Z-axis moving mechanism 32 is driven to maintain a predetermined workpiece gap, whereby the function liquid droplet ejection head 10 is finely moved up and down through the head unit 7. In this case, it may be so arranged that the suction table 26 is subjected to a fine movement.

Once the function liquid droplet ejection head 10 is moved as a result of adjustment of the workpiece gap, the water head H between the sub-tank 142 and the function liquid droplet ejection head 10 varies. Therefore, in order to compensate for the amount of up or down movement of the function liquid droplet ejection head 10 by the gap adjustment, i.e., in order to adequately maintain the water head H (25 mm±0.5 mm) between the sub-tank 142 and the function liquid droplet ejection head 10, the sub-tank 142 is finely moved up and down by the vertical movement mechanism 144 of the tank unit 141.

In this manner, since the workpiece gap is adequately maintained, the wrong hit position of the function liquid droplet or the deviation in the diameter of the hit droplet can be effectively prevented. At the same time, since the water head H between the sub-tank 142 and the function liquid droplet ejection head 10 is adequately maintained, there will occur no deviation in the amount of function liquid droplet (deviation from the design value) at each of the ejection nozzles. It follows that the selective ejection of the function liquid droplet toward the substrate W can be accurately performed.

In the liquid droplet ejection apparatus 1 of the embodiment, there is a case where three kinds (plural kinds) of function liquid droplet election heads 10 (10a, 10b, 10c) of different specifications are detachably mounted, and a case where three (plurality of) function liquid droplet ejection heads 10 with different function liquids are detachably mounted. There is also an intermediate case which falls between the above two cases. The selection of these plural function liquid droplet ejection heads 10 is made depending on the objects to which the function liquids are ejected and the function liquids to be used for that purpose.

As the objects to which the function liquids are ejected, the following are considered, namely, a color filter, a liquid crystal display device, an organic electroluminescence (EL) device, a plasma display panel (PDP) device, an electron emission device (FED device, SED device), or the like. The structure or construction of the above examples as well as the method of manufacturing them by using the liquid droplet ejection apparatus 1 (function liquid droplet ejection head 10) of this embodiment will now be explained.

Figure 12:
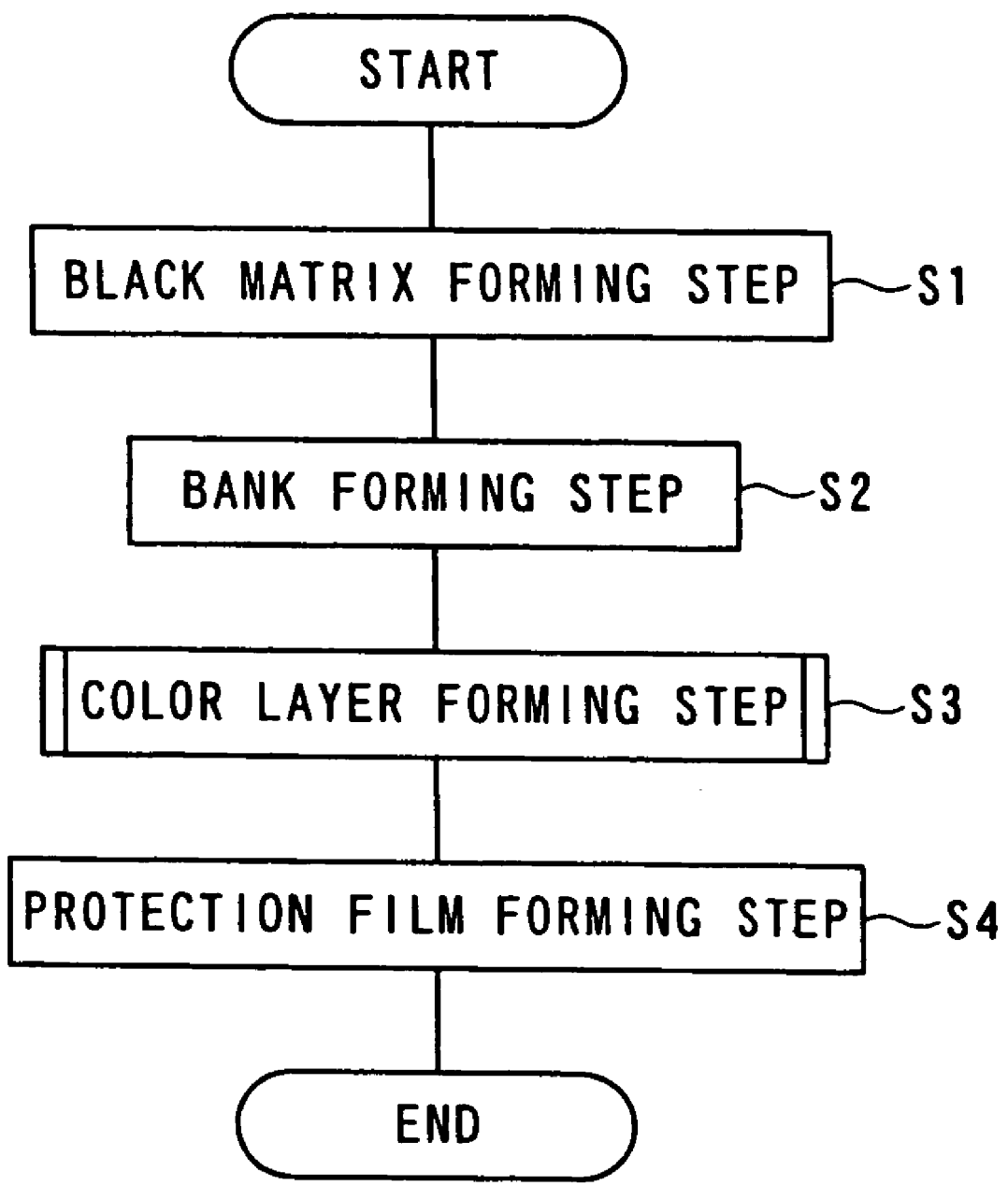
FIG. 12 is a flow chart showing the steps of manufacturing a color filter.

First, an explanation will be made about the method of manufacturing a color filter which is built or assembled in a liquid crystal display device, an organic EL device, or the like. FIG. 12 is a flow chart showing the manufacturing steps of the color filter, and FIGS. 13A through 13E are schematic cross-sectional views showing the color filter 500 (filter base member 500A) of this embodiment, as shown in the order of manufacturing steps.

Figure 13A:
FIGS. 13A through 13E are schematic sectional views of the color filter as shown in the order of manufacturing steps.

First, at the black matrix forming step (S1), as shown in FIG. 13A, a black matrix 502 is formed on a substrate (W) 501. The black matrix 502 is formed of metallic chrome, a laminated member of metallic chrome and chrome oxide, or of resin black, or the like. In order to form the black matrix made of a metallic thin film, the sputtering method, vapor deposition method, or the like, may be used. In addition, in case the black matrix 502 made of a resin thin film is formed, gravure printing method, photo-resist method, thermal transfer method, or the like, may be used.

Figure 13B:
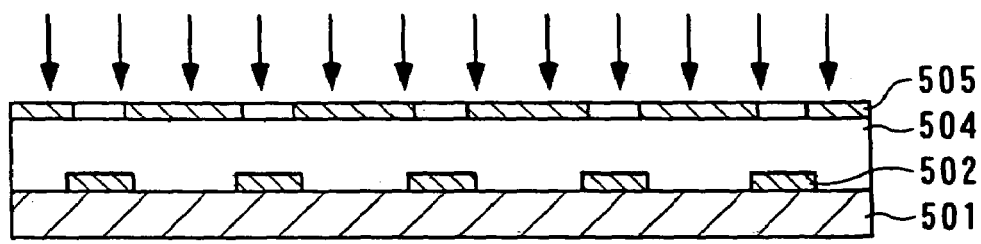

Then, at a bank forming step (S2), a bank 503 is formed in a state of being superimposed on the black matrix 502. In other words, as shown in FIG. 13B, there is formed a resist layer 504 which is made of a negative type of transparent photosensitive resin so as to cover the substrate 501 and the black matrix 502. Then, the upper surface thereof is subjected to exposure processing in a state of being coated with a mask film 505 which is formed in a shape of a matrix pattern.

Figure 13C:
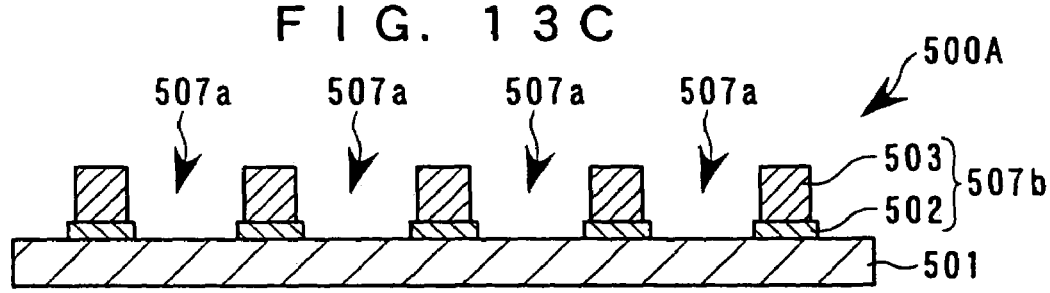

As shown in FIG. 13C, the un-exposed portion of the resist layer 504 is subjected to etching processing to thereby perform patterning of the resist layer 504, to thereby form a bank 503. In case the black matrix is formed by the resin black, it becomes possible to commonly use the black matrix and the bank.

The bank 503 and the black matrix 502 thereunder become a partition wall portion 507b which partitions each of pixel regions 507a, thereby defining a shooting or firing region by the function liquid droplet (i.e., a region in which the function liquid droplet hits the target) at the subsequent color layer forming step to form the color layers (film forming layers) 508R, 508G, 508B.

By performing the above-described black matrix forming step and the bank forming step, the above-described filter base member 500A can be obtained.

As the material for the bank 503, there is used in this embodiment a resin material whose surface of coated film becomes liquid-repellent (water-repellent). Since the surface of the substrate (glass substrate) 501 is liquid-repellent (water-repellent), the accuracy of shooting the liquid droplet into each of the pixel regions 507a enclosed by the bank 503 (partition wall portion 507b) is improved.

Figure 13D:
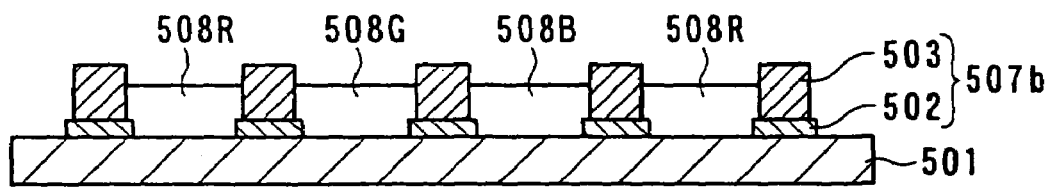

At the subsequent color layer forming step (S3), as shown in FIG. 13D, the function liquid droplet is ejected by the function liquid droplet ejection head 10 to thereby cause the liquid droplet to be shot or fired into each of the pixel regions 507a enclosed by the partition wall portion 507b. At this color layer forming step, the above-described three function liquid droplet ejection heads 10 of the same specification are mounted on the liquid droplet ejection apparatus 1. Three colors of red (R), green (G), and blue (B) function liquids (filter materials) are respectively introduced into these three function liquid droplet ejection heads 10, to thereby eject the function liquid droplets. In this case, it is preferable to use the function liquid droplet ejection heads 10 having a nozzle pitch which coincides with the pitch of the pixels. It is also possible to arrange such that the imaging (droplet ejection) is made in the order of red, green and blue (referred to as R-G-B) over the entire region of the substrate 501, or that the imaging (droplet ejection) is made in the order of R-G-B for each of the main scanning. As the arrangement pattern of three colors of R-G-B, there are stripe arrangement, mosaic arrangement, delta arrangement, or the like.

Figure 13E:
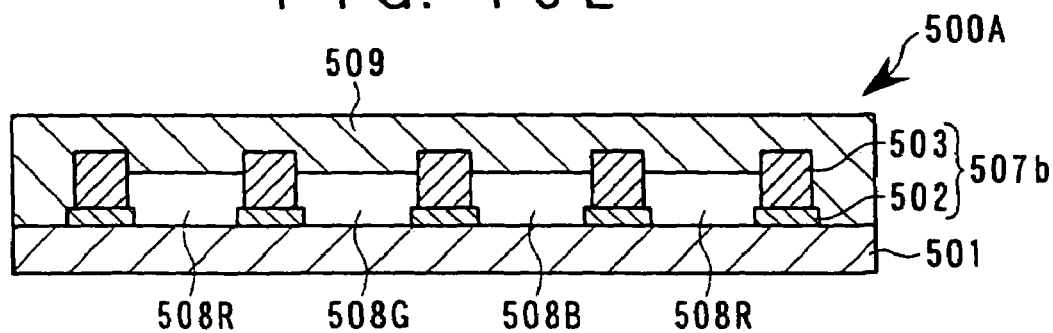

Thereafter, after drying processing (processing of heating, or the like), the function liquid is caused to be fixed to thereby form color layers 508R, 508G, 508B of three colors. Once the color layers have been formed, the step transfers to the protection film forming step (S4). As shown in FIG. 13E, a protection film 509 is formed to cover the upper surface of the substrate 501, the partition wall portion 507b, and color layers 508R, 508G, 508B.

In other words, after having ejected the protection film coating liquid over that entire surface of the substrate 501 on which the color layers 508R, 508B, 508G are formed, the protection film 509 is formed through the drying step.

After having formed the protection film 509, the substrate 501 is cut into respective effective pixel regions to thereby obtain color filters 500.

Figure 14:
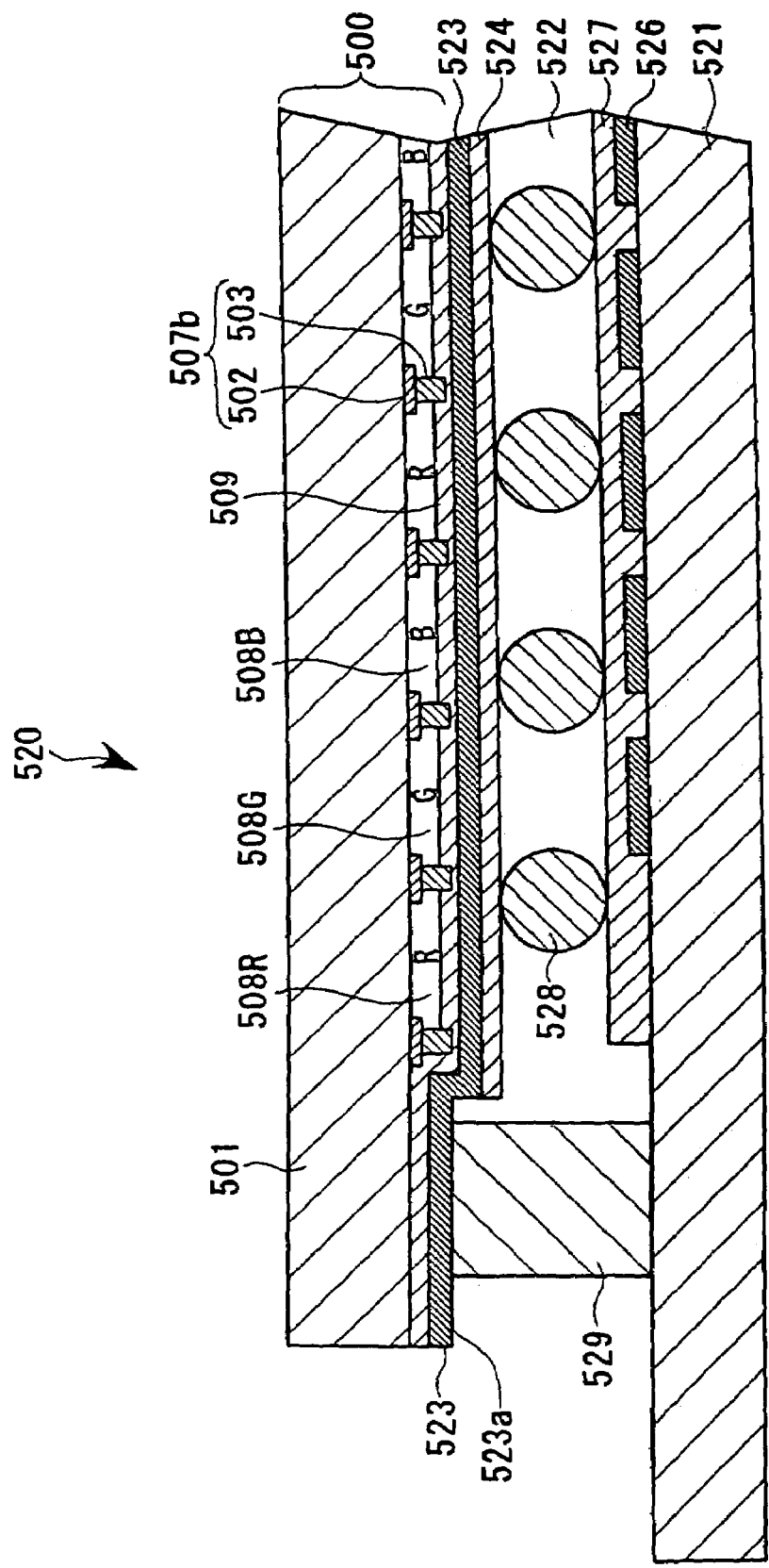
FIG. 14 is a sectional view of an important portion showing a general arrangement of a liquid crystal device using the color filter to which this invention is applied.

FIG. 14 is a sectional view of an important portion showing a general structure of passive matrix type of liquid crystal device (liquid crystal device) as an example of a liquid crystal display device employing the above-described color filter 500. By mounting auxiliary elements such as a liquid crystal driving integrated circuit (IC), backlight, supporting member, or the like, on this liquid crystal device 520, there is obtained a transmission liquid crystal display device as a final product. The color filter 500 is the same as that shown in FIG. 13. Therefore, the same reference numerals are affixed to the corresponding parts/portions and the explanation thereabout is omitted.

This liquid crystal device 520 is made up substantially of: a color filter 500; an opposite substrate 521 made of a glass substrate, or the like; and a liquid crystal layer 522 which is made up of a super twisted nematic (STN) liquid crystal composition interposed therebetween. The color filter 500 is disposed on an upper side as seen in the figure (i.e., on a side from which the viewer looks at the color filter).

Although not illustrated, on an outside surface of the opposite substrate 521 and of the color filter 500 (i.e., the surface which is opposite to the liquid crystal layer 522), there is respectively disposed a polarizer. On an outside of the polarizer which is positioned on the side of the opposite electrode 521, there is disposed a backlight.

On the protection film 509 (on the side of the liquid crystal) of the color filter 500, there are disposed a plurality of rectangular first electrodes 523 which are elongated in the left and right direction as seen in FIG. 14. A first orientation film 524 is formed so as to cover that side of the first electrode 523 which is opposite to the color filter 500.

On that surface of the opposite substrate 521 which lies opposite to the color filter 500, a plurality of second electrodes 526 are formed at a given distance to one another in a direction at right angles to the first electrode 523. A second orientation film 527 is formed so as to cover that surface of the second electrode 526 which is on the side of the liquid crystal layer 522. The first electrode 523 and the second electrode 526 are formed by a transparent conductive material such as indium tin oxide (ITO), or the like.

The spacer 528 which is provided inside the liquid crystal layer 522 is a material to keep the thickness of the liquid crystal layer 522 (cell gap) constant. The sealing material 529 is a material to prevent the liquid crystal composition inside the liquid crystal layer 522 from leaking outside. One end of the first electrode 523 is extended to the outside of the sealing material 529 as a running cable 523a.

The crossing portions between the first electrode 523 and the second electrode 526 are the pixels. It is thus so arranged that the color layers 508R, 508G, 508R of the color filter 500 are positioned in these portions which form the pixels.

At the ordinary manufacturing steps, the color filter 500 is coated with the patterning of the first electrode 523 and the first orientation film 524, to thereby form the portion on the side of the color filter 500. Aside from the above, the opposite substrate 521 is coated with the patterning of the second electrode 526 and the second orientation film 527, to thereby form the portion on the side of the opposite substrate 521. Thereafter, the spacer 528 and the sealing material 529 are formed into the portion on the side of the opposite substrate 521, and the portion on the side of the color filter 500 is adhered to the above-described portion in that state. Then, the liquid crystal which forms the liquid crystal layer 522 is filled from an inlet port, and the inlet port is closed thereafter. Thereafter, both the polarizers and the backlight are laminated.

In the liquid droplet ejection apparatus 1 of this embodiment, the spacer material (function liquid) which forms, e.g., the cell gap is coated. And, before the portion on the side of the color filter 500 is adhered to the portion on the side of the opposite substrate 521, the liquid crystal (function liquid) is uniformly coated on the region enclosed by the sealing material 529. In concrete, the coating of the spacer material is made by using the second ejection head 10b which has a smaller number of nozzles and a larger amount of function liquid ejection per unit. As the function liquid (spacer material), an ultraviolet curing resin is introduced. The coating of the liquid crystal is made, depending on the kind of the liquid crystal, by using the first ejection head 10a if the liquid is of low viscosity (and by using the third ejection head 10c if the liquid is of high viscosity).

In this case, the second ejection head 10b is mounted in advance on the sub-carriage 9 and the first ejection head 10a is mounted on the head stocker 12. First, that portion of the opposite electrode 521 in which the sealing material 529 is printed in an annular shape is set in position on the suction table. The spacer material is ejected by the first function liquid droplet ejection head 10a at a rough space onto the portion on the side of the opposite electrode 521, and the spacer material is cured by ultraviolet irradiation. During this ultraviolet irradiation, the second ejection head 10b is transferred to the head stocker 12 and the first ejection head 10a to the sub-carriage 9. Then, the liquid crystal is uniformly ejected by the first ejection head 10a by a given amount to an inside of the sealing material on the side of the opposite electrode 521. Thereafter, the separately prepared portion on the side of the color filter and that portion on the side of the opposite electrode 521 which is coated with the crystal liquid are introduced into vacuum for adhering them together.

In this manner, before the portion on the side of the color filter 500 and the portion of the opposite electrode 521 are adhered together, the liquid crystal is uniformly coated on (filled into) the cell. There can thus be eliminated the disadvantage in that the liquid crystal (liquid crystal layer 522) does not spread to every corner portion.

It is possible to carry out the printing of the sealing material 529 with the function liquid droplet ejection head 10. In such a case, the third ejection head 10c which has a specification suitable for a relatively high viscosity for printing (coating) the sealing material 529 is used and an ultraviolet curing resin or a thermal setting resin is introduced into the head 10c as the function liquid (as the material for the sealing material). In this case, the third ejection head 10c is mounted in advance on the sub-carriage 9 together with the second ejection head 10b. If possible, the second ejection head 10b and the third ejection head 10c are driven in parallel with each other so that the ejection of the sealing material 529 and the ejection of the spacer material can be performed in parallel with each other.

Further, it is also possible to perform the coating of the first and second orientation films 524, 527 by the function liquid droplet ejection head 10. In this case, a fourth function liquid ejection head 10d to coat the orientation films 524, 527 shall be of specification for a large number of nozzles for use with a low-viscosity fluid (e.g., like the first ejection head 10a). A polyimide resin is introduced therein as the function liquid (orientation film material). First, the fourth function liquid ejection head 10d is introduced into the sub-carriage 9, and the other function liquid droplet ejection heads 10a, 10b, 10c are sequentially replaced in accordance with the steps.

In this manner, in the liquid droplet ejection apparatus 1 of this embodiment, plural kinds of function liquid droplet ejection heads 10 to eject the plural kinds of function liquids are mounted in a manner to be replaceable between the sub-carriage 9 and the head stocker 12. Therefore, depending on the mode of substrate processing, the plural kinds of function liquids can be freely ejected. As a result, the substrate processing can be efficiently performed in the manufacturing, or the like, of the liquid crystal device 520.

Figure 15:
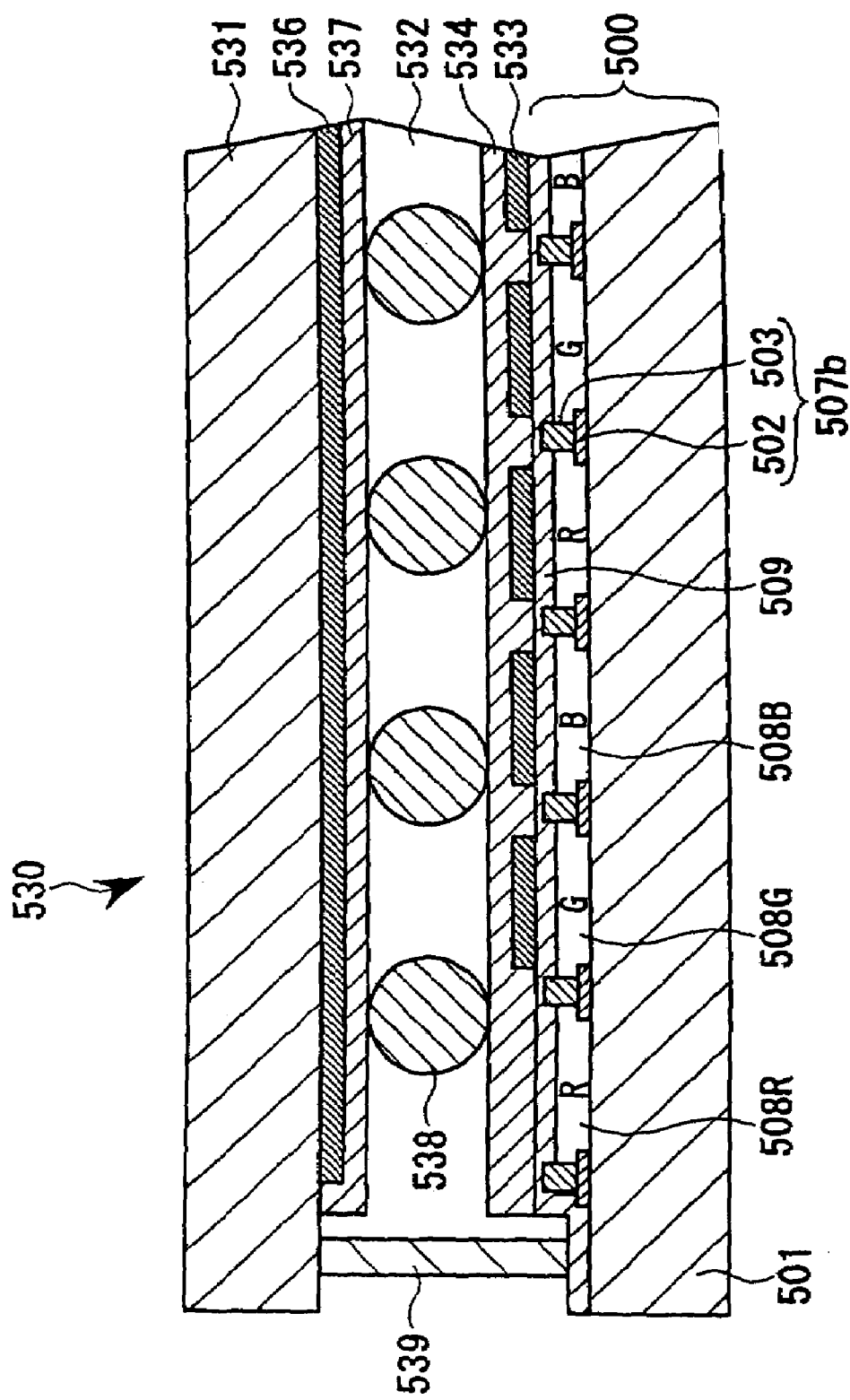
FIG. 15 is a sectional view of an important portion showing a general arrangement of a liquid crystal device of a second example using the color filter to which this invention is applied.

FIG. 15 is a sectional view of an important portion showing a general structure of liquid crystal device using a color filter 500 manufactured in this embodiment.

What this liquid crystal device 530 is largely different from the above-described liquid crystal device 520 is that the color filter 500 is disposed on the lower side as seen in the figure (i.e., on the side opposite to the side from which the viewer looks at the device).

This liquid crystal device 530 is constructed such that a liquid crystal layer 532 which is made of an STN liquid crystal is sandwiched between the color filter 500 and the opposite substrate 531 which is made by a glass substrate, or the like. Though not illustrated, a polarizer, or the like, is disposed on an outside surface of the opposite substrate 531 and the color filter 500, respectively.

On the protection film 509 (on the side of the liquid crystal layer 532) of the color filter 500, there are disposed a plurality of rectangular first electrodes 533 which are elongated in a direction at right angles to the surface of the figure (FIG. 15). A first orientation film 534 is formed so as to cover that side of the first electrode 533 which is on the side of the liquid crystal layer 532.

On that surface of the opposite substrate 531 which lies opposite to the color filter 500, a plurality of second electrodes 536 are formed at a given distance to one another in a direction at right angles to the first electrode 533. A second orientation film 537 is formed so as to cover that surface of the second electrode 536 which is on the side of the liquid crystal layer 532.

The liquid crystal layer 532 is provided with a spacer 538 to keep the thickness of the liquid crystal layer 532 constant, and a sealing material 539 to prevent the liquid crystal composition inside the liquid crystal 532 layer from leaking outside.

In the same manner as in the above-described liquid crystal device 520, the crossing portions between the first electrode 533 and the second electrode 536 are the pixels. It is thus so arranged that the color layers 508R, 508G, 508B of the color filter 500 are positioned in these portions which form the pixels.

Figure 16:
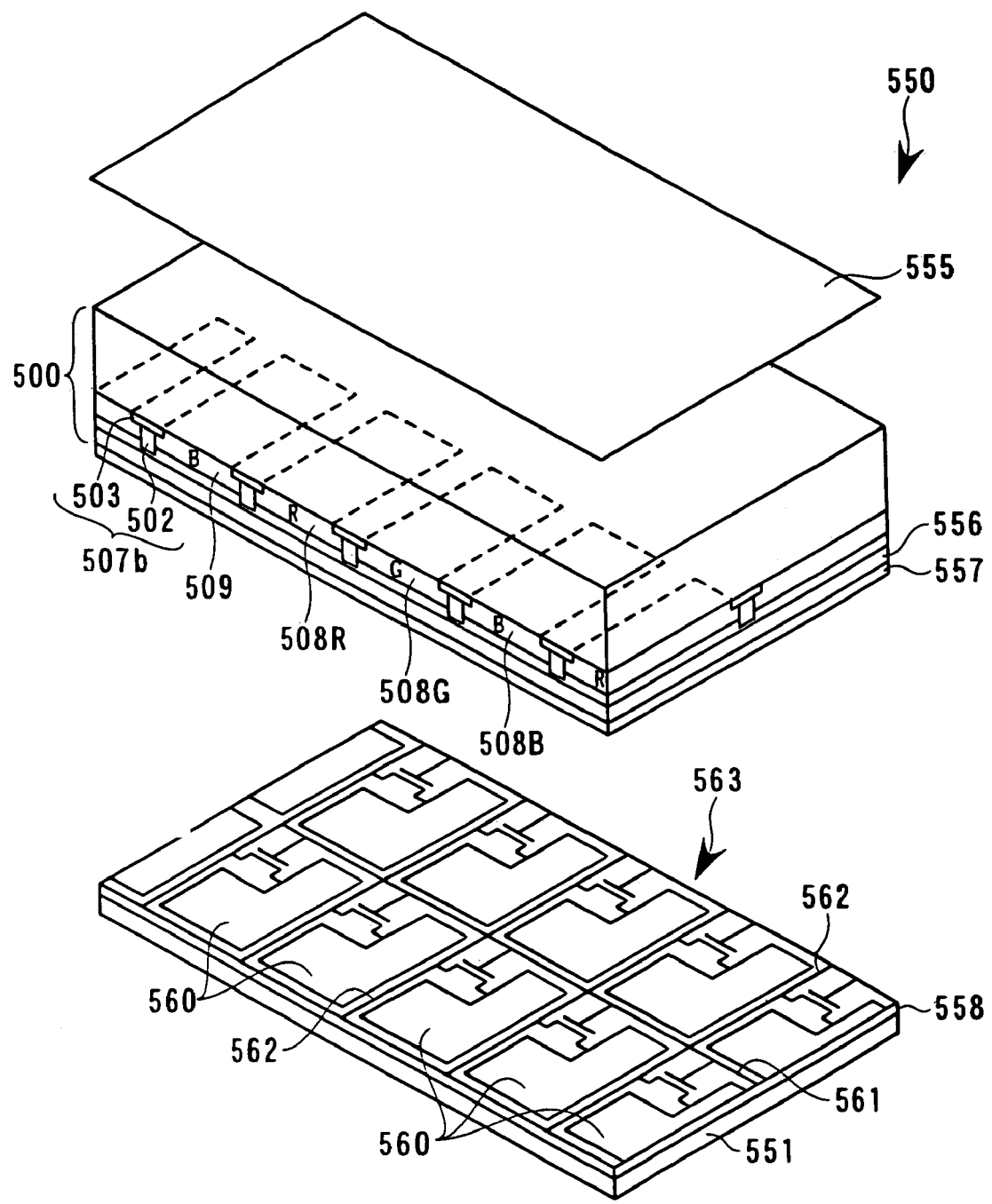
FIG. 16 is a sectional view of an important portion showing a general arrangement of a liquid crystal device of a third example using the color filter to which this invention is applied.

FIG. 16 is an exploded perspective view of an important portion showing a general structure of a transmission thin film transistor (TFT) liquid crystal device using a color filter 500 to which this invention is applied.

This liquid crystal device 550 has a construction in which the color filter 500 is disposed on an upper side as seen in the figure (i.e., on the side of the viewer).

This liquid crystal device 550 is made up of: the color filter 500; an opposite substrate 551 which is disposed to lie opposite to the color filter 500; a liquid crystal layer which is sandwiched therebetween; a polarizer 555 which is disposed on an upper side (on the side of the viewer) of the color filter 500; and a polarizer (not illustrated) which is disposed on the lower side of the opposite electrode 551.

On the surface (i.e., the surface on the side of the opposite substrate 551) of a protection film 509 of the color filter 500, there is formed an electrode 556 for the liquid crystal driving. This electrode 556 is made of a transparent conductive material such as an ITO, or the like, and is formed into an entire-surface electrode which covers the entire region in which the pixel electrodes 560 (to be described later) are formed. An orientation film 557 is disposed in a state of covering the opposite surface of this pixel electrodes 560 of the electrode 556.

On that surface of the opposite substrate 551 which lies opposite to the color filter 500, there is formed an insulating layer 558. On this insulating layer 558 there are formed scanning lines 561 and signal lines 562 in a state of crossing each other at right angles. Pixel electrodes 560 are formed inside the regions enclosed by the scanning lines 561 and the signal lines 562. In the actual liquid crystal device, there will be disposed an orientation film (not illustrated) on the pixel electrode 560.

In the notched portion of the pixel electrode 560 and in the portion which is enclosed by the scanning line 561 and the signal line 562, there are built in or assembled a thin film transistor which is provided with a source electrode, a drain electrode, a semiconductor, and a gate electrode. By charging signals to the scanning line 561 and the signal line 562, the thin film transistor 563 can be switched on and off so as to control the supply of electric current to the pixel electrode 560.

Although the above-described liquid crystal devices 520, 530, 550 of each of the above examples is constituted into a transmission type, it may also be constituted into a reflective type of liquid crystal device or into a translucent reflective type of liquid crystal device by providing a reflective layer or a translucent reflective layer, respectively.

Figure 17:
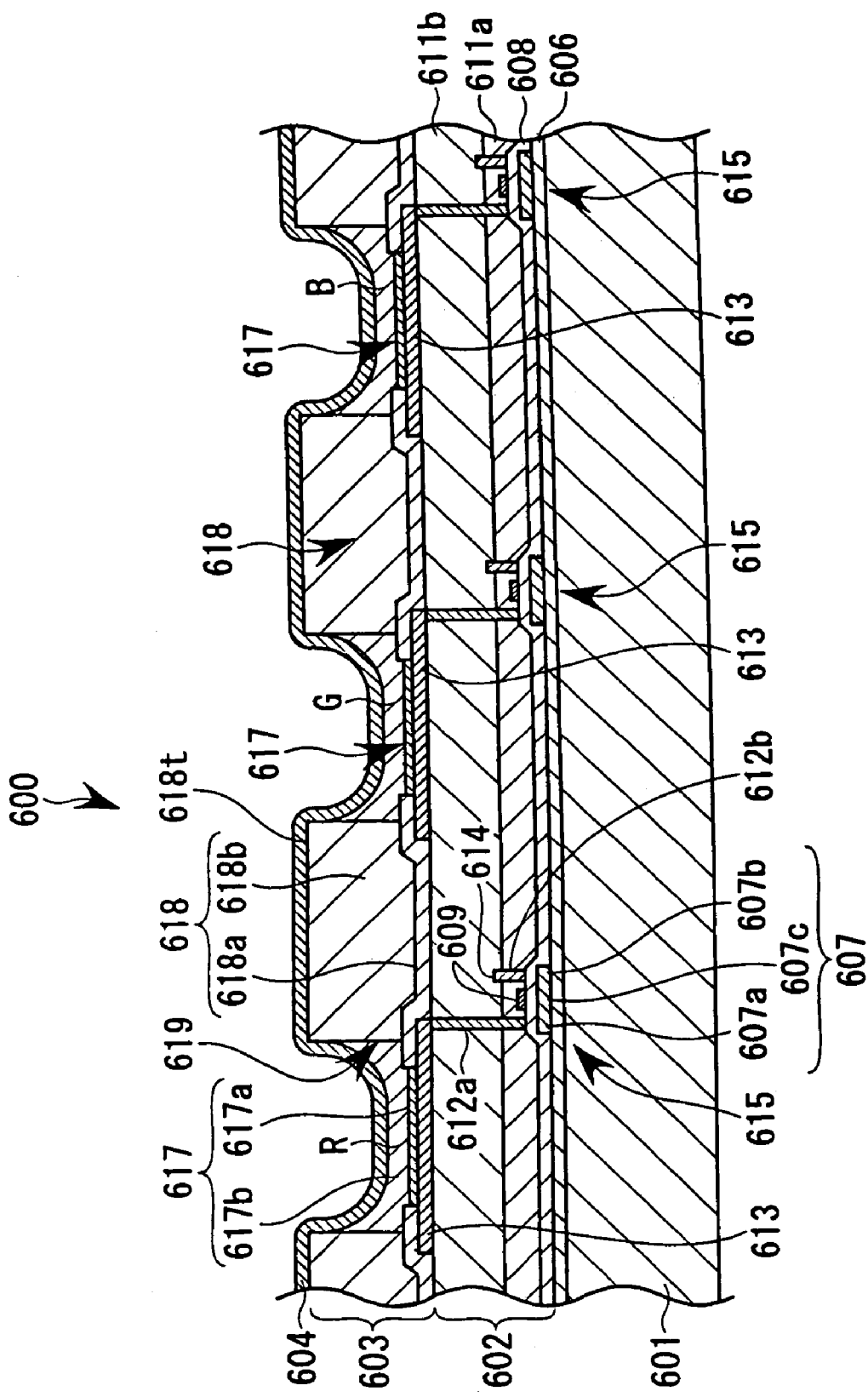
FIG. 17 is a sectional view of an important portion of the display device according to the second embodiment.

A description will now be made about a second embodiment of this invention. FIG. 17 is a sectional view of an important part of a display region of an organic EL device (hereinafter referred to as a display device 600) which is a kind of display according to this invention.

This display device 600 is substantially constituted by a substrate 601 (W), and on this substrate are laminated a circuit element part 602, light-emitting element part 603 and a cathode 604.

In this display device 600, the light emitted from the light-emitting element part 603 toward the substrate 601 is transmitted through the circuit element part 602 and the substrate 601. The light emitted from the light-emitting element part 603 toward the side opposite to the substrate 601 is reflected by the cathode 604 and passes through the circuit element part 602 and the substrate 601 for ejection toward the viewer.

Between the circuit element part 602 and the substrate 601, there is formed a base protection film 606 which is made of a silicon oxide film. On top of this base protection film 606 (on the side of the light-emitting element 603), there is formed an island shaped semiconductor film 607 which is made of polycrystalline silicon. In the left and right regions of this semiconductor film 607, there are respectively formed a source region 607*a* and a drain region 607*b* by high-concentration anion implantation. The central portion which is free from anion implantation becomes a channel region 607*c*.

In the circuit element part 602, there is formed a transparent gate insulation film 608 which covers the base protection film 606 and the semiconductor film 607. In that position on this gate insulation film 608 which corresponds to the channel region 607*c* of the semiconductor film 607, there is formed a gate electrode 609 which is made up of Al, Mo, Ta, Ti, W, or the like. On top of this gate electrode 609 and the gate insulation film 608, there are formed a transparent first interlayer dielectric film 611*a* and a second interlayer dielectric film 611*b*. Through the first and second interlayer dielectric films 611*a*, 611*b*, there are formed contact holes 612*a*, 612*b* which are in communication with the source region 607*a* and the drain region 607*b*, respectively, of the semiconductor film 607.

On top of the second interlayer dielectric film 611*b*, there is formed, by patterning, a transparent pixel electrode 613 which is made of ITO, or the like. This pixel electrode 613 is connected to the source region 607*a* through the contact hole 612*a*.

On top of the first interlayer dielectric film 611*a*, there is formed an electric source wiring 614, which is connected to the drain region 607*b* through the contact hole 612*b*.

As described hereinabove, the circuit element part 602 has formed therein a driving thin film transistor 615 which is connected to each of the pixel electrodes 613.

The above-described light-emitting element part 603 is made up of: a function layer 617 which is laminated on each of the plurality of pixel electrodes 613; and a bank part 618 which is provided between each of the pixel electrodes 613 and the function layers 617 to thereby partition each of the function layers 617.

The light-emitting element is constituted by these pixel electrodes 613, the function layer 617, and the cathode 604 which is disposed on the function layer 617. The pixel electrode 613 is formed into a substantial rectangle as seen in plan view, and the bank part 618 is formed between each of the pixel electrodes 613.

The bank part 618 is made up of: an inorganic-matter bank layer 618*a* (first bank layer) which is formed by inorganic materials such as SiO, $SiO_2$, $TiO_2$, or the like; and an organic-matter bank layer 618*b* (second bank layer) which is trapezoidal in cross section and which is formed by a resist superior in heat-resistance and solvent-resistance such as an acrylic resin, a polyimide resin, or the like. Part of this bank part 618 is formed in a state of being overlapped with the peripheral portion of the pixel electrode 613.

Between each of the bank parts 618, there is formed an opening part 619 which gradually enlarges towards an upward.

The function layer 617 is made up of: a hole injection/transport layer 617a which is formed inside the opening part 619 in a state of being laminated on the pixel electrode 613; and a light-emitting layer 617b which is formed on this hole injection/transport layer 617a. It may be so arranged that other function layers having other functions are further formed adjacent to the light-emitting layer 617b. For example, an electron transport layer may be formed.

The hole injection/transport layer 617a has a function of transporting holes from the pixel electrode 613 side for injection into the light-emitting layer 617b. This hole injection/transport layer 617a is formed by ejecting the first composition of matter (function liquid) containing therein the hole injection/transport layer forming material. As the hole injection/transport layer forming material, there may be used a mixture of polythiophene derivative such as polyethylenedioxythiophene, and polystyrenesulfonic acid, or the like.

The light-emitting layer 617b emits light of red (R), green (G) or blue (B), and is formed by ejecting the second composition of matter (function liquid) containing the light-emitting layer forming material (light-emitting material). As the solvents for the second composition of matter (nonpolar solvent), it is preferable to use those which are insoluble to the hole injection/transport layer 120a. For example, the following may be used, i.e., cyclohexylbenzene, dihydrobenzofuran, trimethylbenzene, tetramethylbenzene, or the like. By using this kind of nonpolar solvent as the second composition of matter of the light-emitting layer 617b, the light-emitting layer 617b can be formed without dissolving the hole injection/transport layer 617a again.

The light-emitting layer 617b is so arranged that the holes injected from the hole injection/transport layer 617a and the electron injected from the cathode 604 get bonded again in the light-emitting layer to thereby emit light.

The cathode 604 is formed in a state to cover the entire surface of the light-emitting element part 603, and forms a pair with the pixel electrode 613 to thereby cause the electric current to flow through the function layer 617. A sealing member (not illustrated) is disposed on top of this cathode 604.

Then, a description will be made about the manufacturing steps of the display device 600 with reference to FIGS. 18 through 26.

Figure 18:
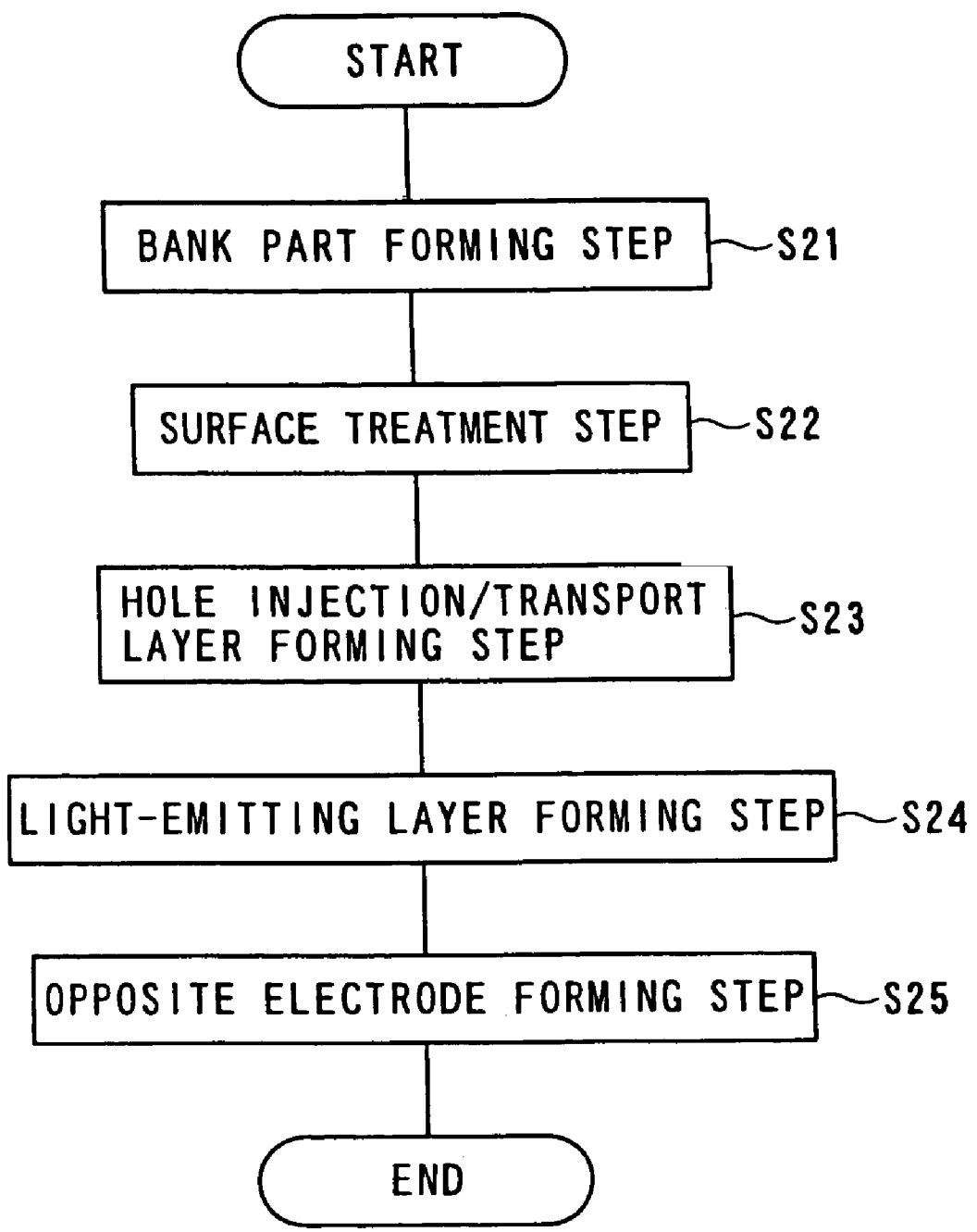
FIG. 18 is a flow chart showing the steps of manufacturing the display device according to the second embodiment.

As shown in FIG. 18, this display device 106 is manufactured through the following steps, i.e., a bank part forming step (S21), a surface treatment step (S22), a hole injection/transport layer forming step (S23), a light-emitting layer forming step (S24), and an opposite electrode forming step (S25). The manufacturing steps need not be limited to the illustrated ones; some steps may be omitted or others added if necessary.

Figure 19:
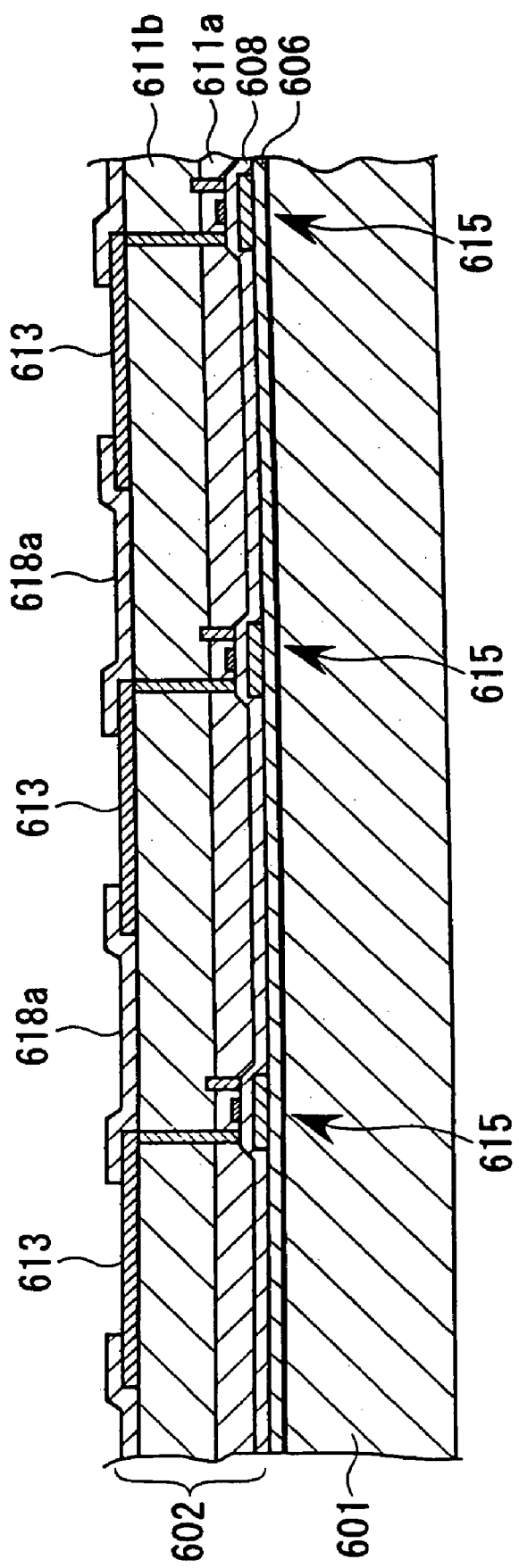
FIG. 19 is a process drawing showing the formation of an inorganic-matter bank layer.

First, at the bank part forming step (S21), an inorganic-matter bank layer 618a is formed on the second interlayer dielectric film 611b as shown in FIG. 19. This inorganic-matter bank layer 618a is formed, after having formed an inorganic-matter film on the forming position, by patterning the inorganic-matter film by means of photolithography, or the like. At this time, part of the inorganic-matter bank layer 618a is formed so as to overlap with the peripheral portion of the pixel electrode 613.

Figure 20:
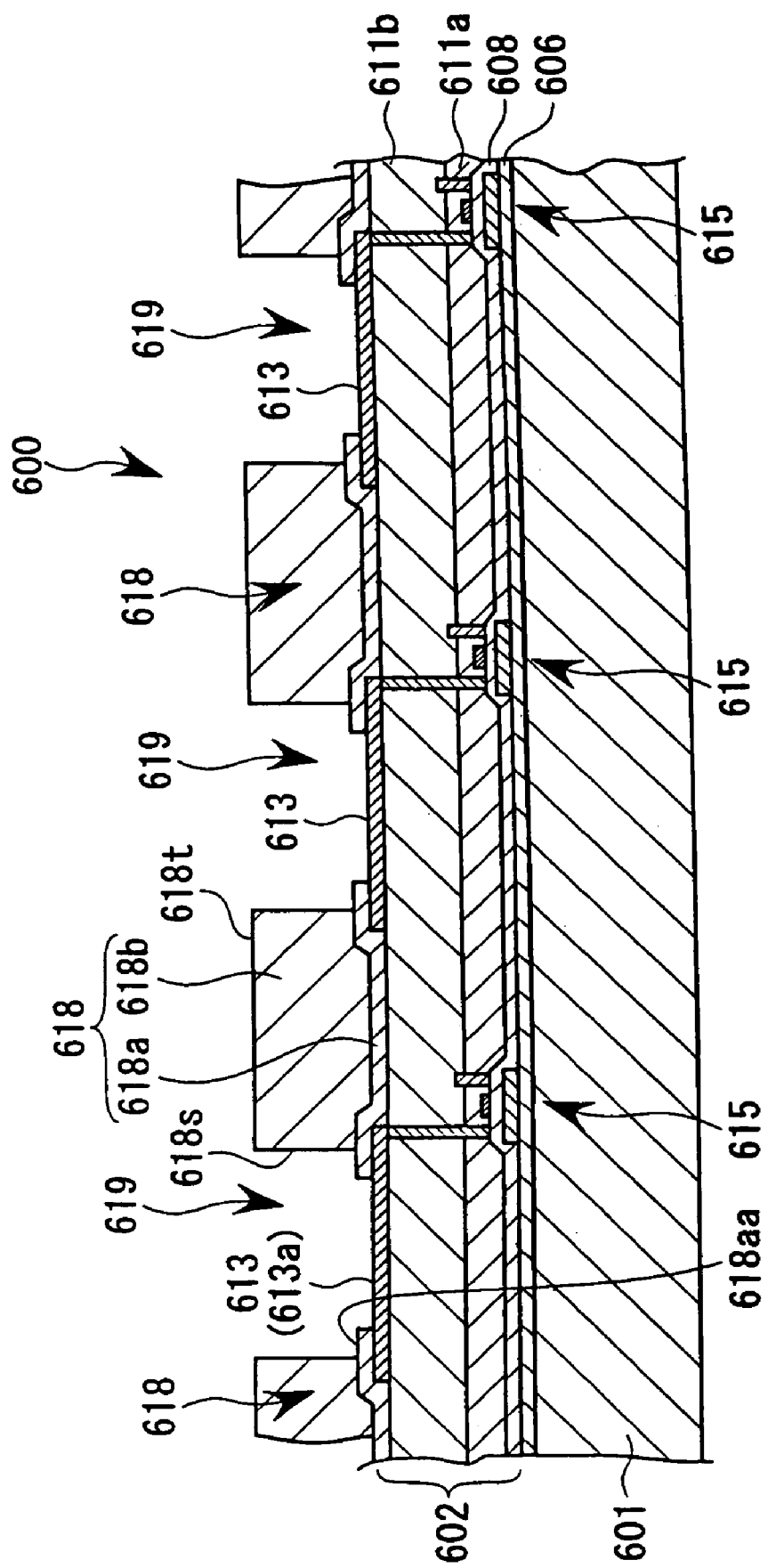
FIG. 20 is a process drawing showing the formation of an organic-matter bank layer.

Once the inorganic-matter bank layer 618a has been formed, an organic-matter bank layer 618b is formed on top of the inorganic-matter bank layer 618a as shown in FIG. 20. This organic-matter bank layer 618b is formed, as in the case of the inorganic-matter bank layer 618a, by patterning by means of photolithography, or the like.

The bank part 618 is formed as described above. As a result, an opening part 619 which opens upward relative to the pixel electrode 613 is formed. This opening part 619 defines a pixel region.

At the surface treatment step (S22), the liquid-affinity processing (treatment to gain affinity to liquid) and the liquid-repellency processing (treatment to gain repellency to liquid) are performed. The region in which the liquid-affinity processing is to be performed are the first laminated part 618aa of the inorganic-matter bank layer 618a and the electrode surface 613a of the pixel electrode 613. These regions are subjected to surface treatment to obtain liquid affinity by means, e.g., of plasma processing using oxygen as the processing gas. This plasma processing also serves the purpose of cleaning the ITO which is the pixel electrode 613.

The liquid-repellency processing, on the other hand, is performed on the wall surface 618s of the organic-matter bank layer 618b and on the upper surface 618t of the organic-matter bank layer 618b. By means of plasma processing with, e.g., methane tetrafluoride as the processing gas, the surface is subjected to fluoridizing processing (processed to obtain liquid-repellent characteristic).

By performing this surface processing step, it becomes possible for the function liquid droplet to reach (or hit) the pixel region in a surer manner when the function layer 617 is formed by using the function liquid droplet ejection head 10. It also becomes possible to prevent the function liquid droplet that has hit the pixel region from flowing out of the opening part 619.

By going through the above-described steps, the display device substrate 600A can be obtained. This display device substrate 600A is mounted on the setting table 25 of the liquid droplet ejection apparatus 1 as shown in FIG. 1, and the following hole injection/transport layer forming step (S23) and the light-emitting layer forming step (S24) are performed.

Figure 21:
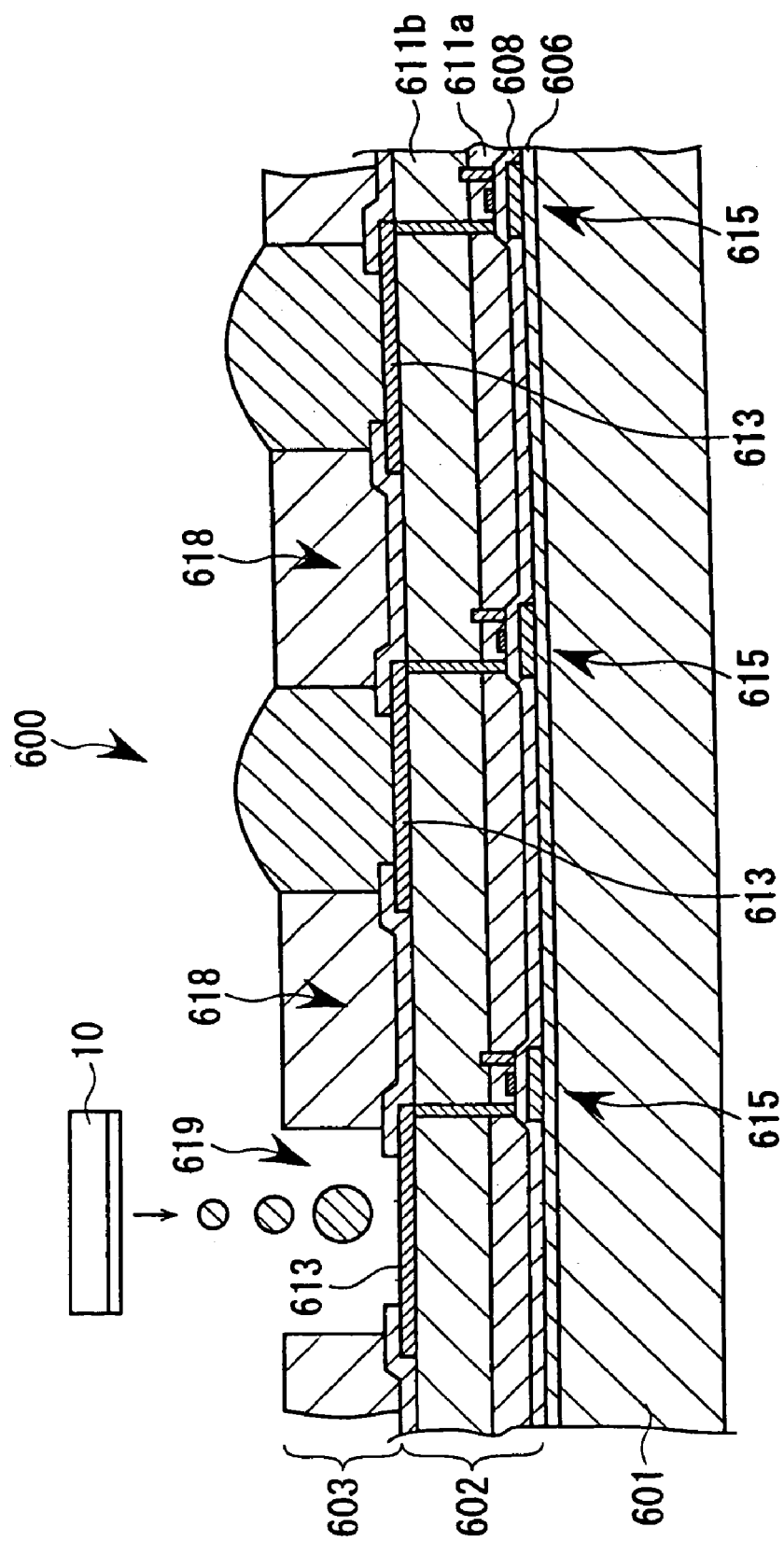
FIG. 21 is a process drawing showing the steps of manufacturing a hole injection/transport layer.
Figure 22:
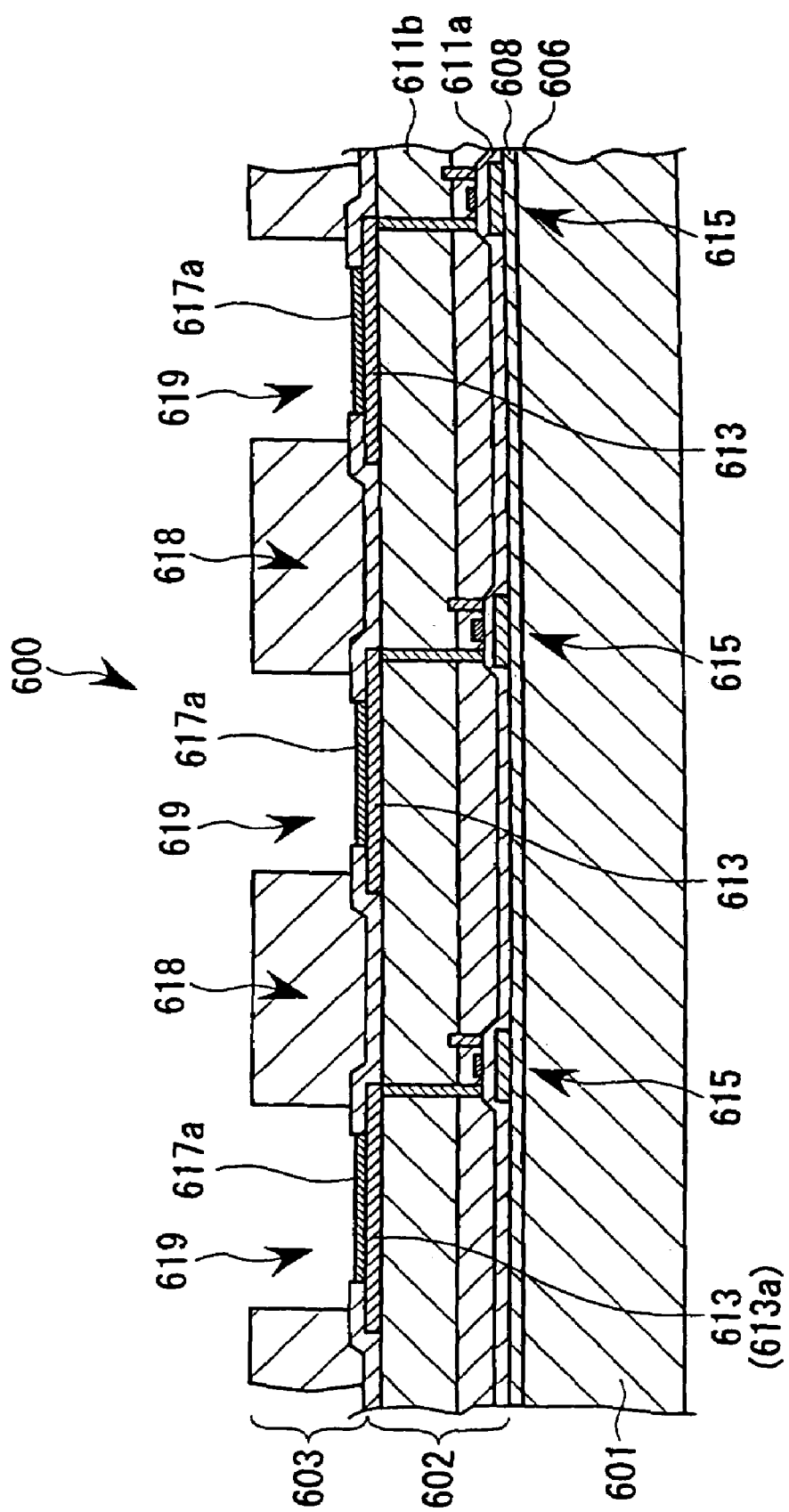
FIG. 22 is a process drawing showing the state in which the hole injection/transport layer has been formed.

As shown in FIG. 21, at the hole injection/transport layer forming step (S23), the first composition of matter containing therein the hole injection/transport layer forming material is ejected from the function liquid droplet ejection head 10 into each of the opening parts 619. Thereafter, as shown in FIG. 22, drying process and heat-treatment process are performed in order to evaporate the polar solvent contained in the first composition of matter, whereby the hole injection/transport layer 617a is formed on the pixel electrode (electrode surface 613a) 613.

A description will now be made about the light-emitting layer forming step (S24). At this light-emitting layer forming step, as described above, in order to prevent the hole injection/transport layer 617a from getting resolved again, there is used a non-polar solvent which is insoluble to the hole injection/transport layer 617a as a solvent for the second composition of matter to be used in forming the light-emitting layer.

On the other hand, since the hole injection/transport layer 617a is low in affinity to the non-polar solvent, it will be impossible to closely adhere the hole injection/transport layer 617a to the light-emitting layer 617b or to uniformly coat the light-emitting layer 617b even if the second composition of matter containing therein the non-polar solvent is ejected onto the hole injection/transport layer 617a.

As a solution, in order to enhance the affinity of the surface of the hole injection/transport layer 617a to the non-polar solvent and to the light-emitting layer forming material, it is preferable to perform the surface treatment (treatment to improve the quality of the surface) before forming the light-emitting layer. This surface treatment is performed by coating the hole injection/transport layer 617a with a solvent which is the same as, or similar to, the non-polar solvent of the second composition of matter to be used in forming the light-emitting layer, and then drying it.

By performing this kind of treatment, the surface of the hole injection/transport layer 617a easily conforms to the non-polar solvent. It becomes thus possible to uniformly coat, at a subsequent step, the hole injection/transport layer 617a with the second composition of matter containing therein the light emitting layer forming material.

Figure 23:
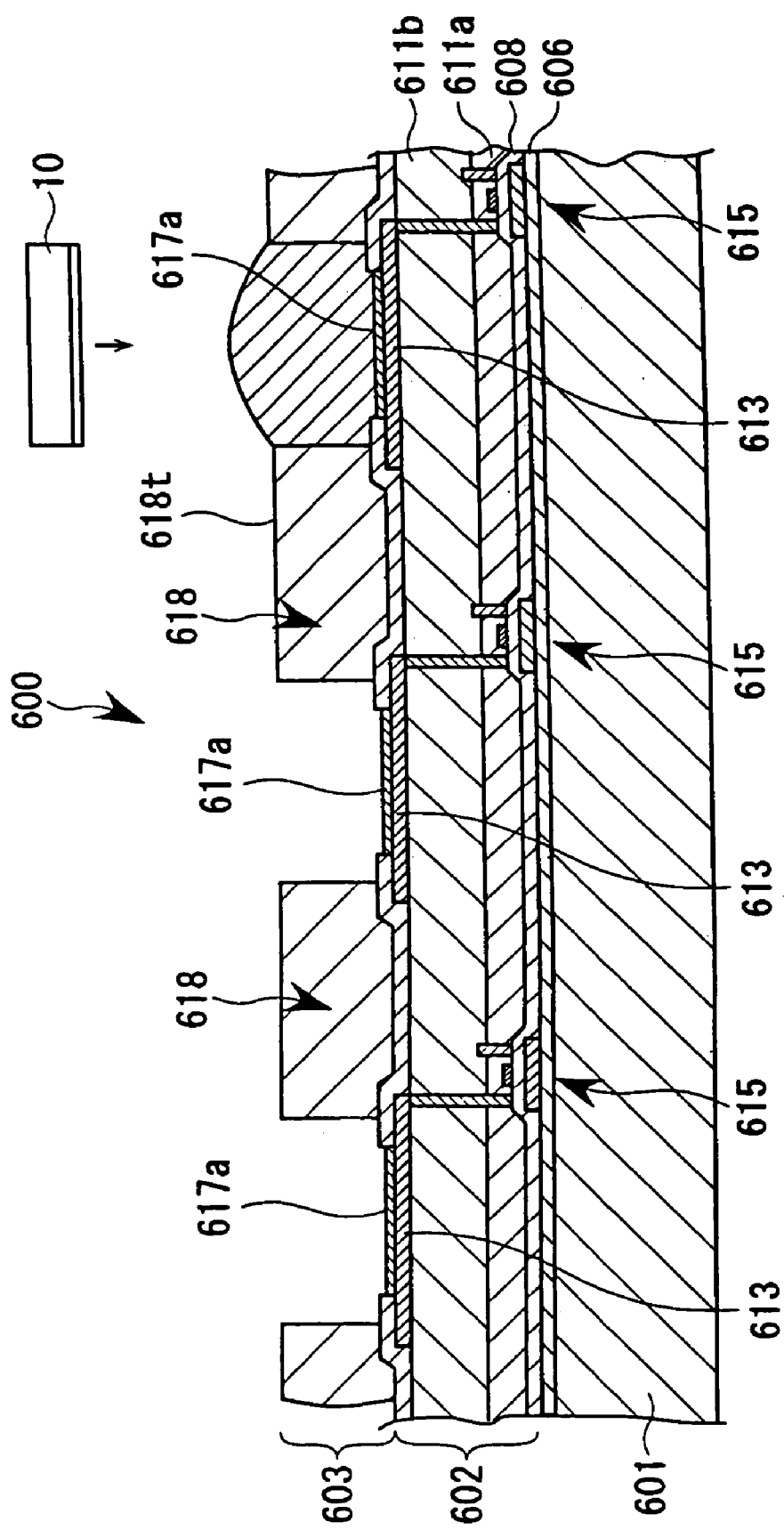
FIG. 23 is a process drawing showing the steps of manufacturing the blue light emitting layer.

Thereafter, as shown in FIG. 23, the second composition of matter containing therein the light emitting layer forming material corresponding to one of the colors (blue in the example in FIG. 23) is implanted into the pixel region (opening part 619) by a predetermined amount. The second composition of matter implanted into the pixel region gets spread over the hole injection/transport layer 617a to thereby fill the opening part 619. Even if the second composition of matter goes out of the pixel region to thereby hit the upper surface 618t of the bank part 618, this upper surface 618t has been subject to the liquid-repellent treatment as described above. Therefore, the second composition of matter is likely to be easily rolled into the opening part 619.

At this light-emitting layer forming step, three function liquid droplet ejection heads 10 of the same specification are mounted on the above-described liquid droplet ejection apparatus 1. Three colors of R, G, B function liquids (second composition of matter) are respectively introduced into these three function liquid droplet ejection heads 10 for ejecting the function liquid droplet. In this case, it is preferable to use the function liquid droplet ejection heads 10 having a nozzle pitch coinciding with the pitch of the pixel pitch. In addition, it may be so arranged that picturing or imaging (ejection of liquid droplet) is performed in the order of R, G, B for the entire region of the substrate 601, or is performed in the order of R, G, B for each time of main scanning. The arrangement pattern of the three colors of R, G, B may be of a stripe arrangement, a mosaic arrangement, delta arrangement, or the like.

Figure 24:
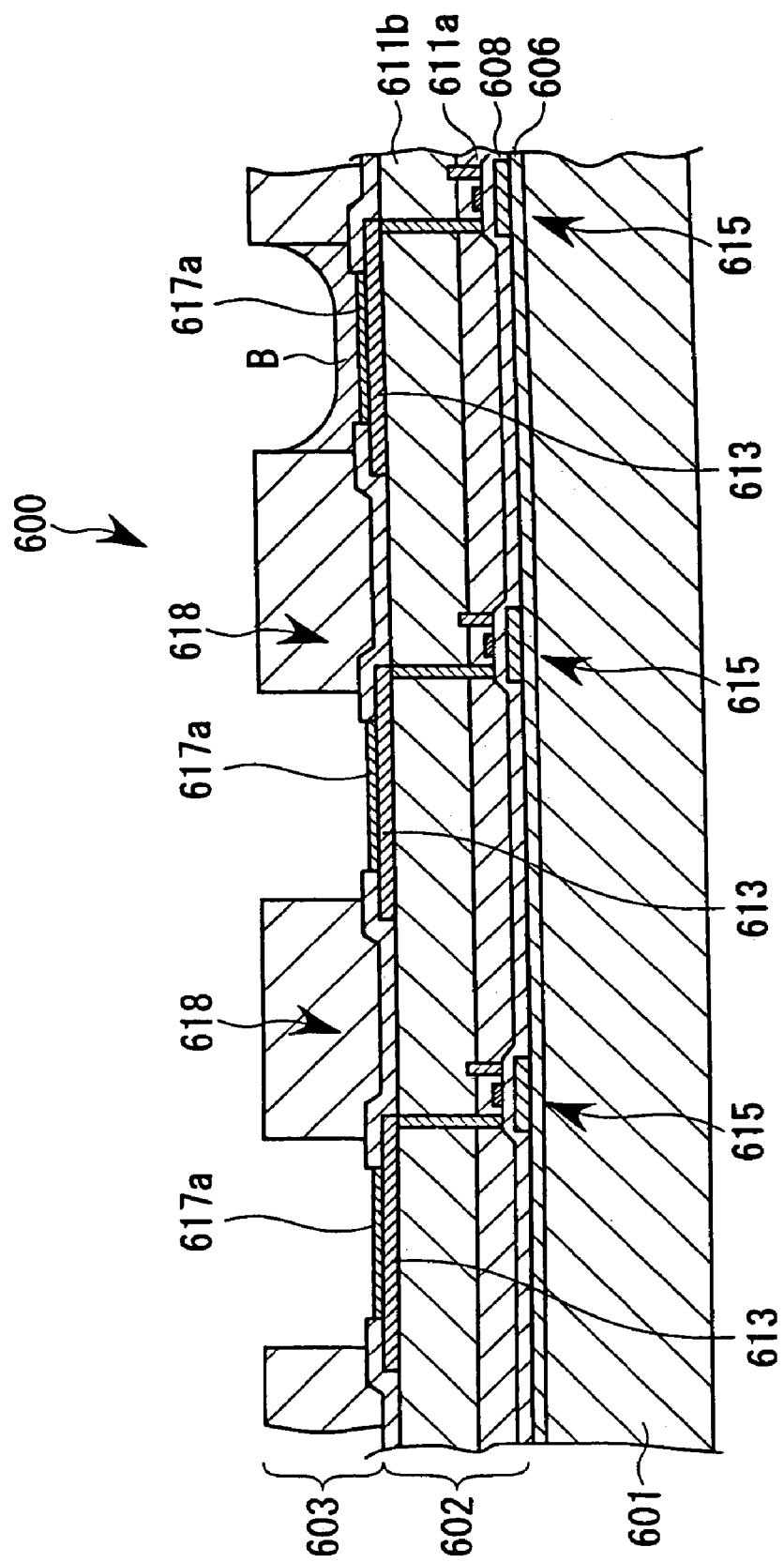
FIG. 24 is a process drawing showing the state in which the blue light emitting layer has been formed.
Figure 25:
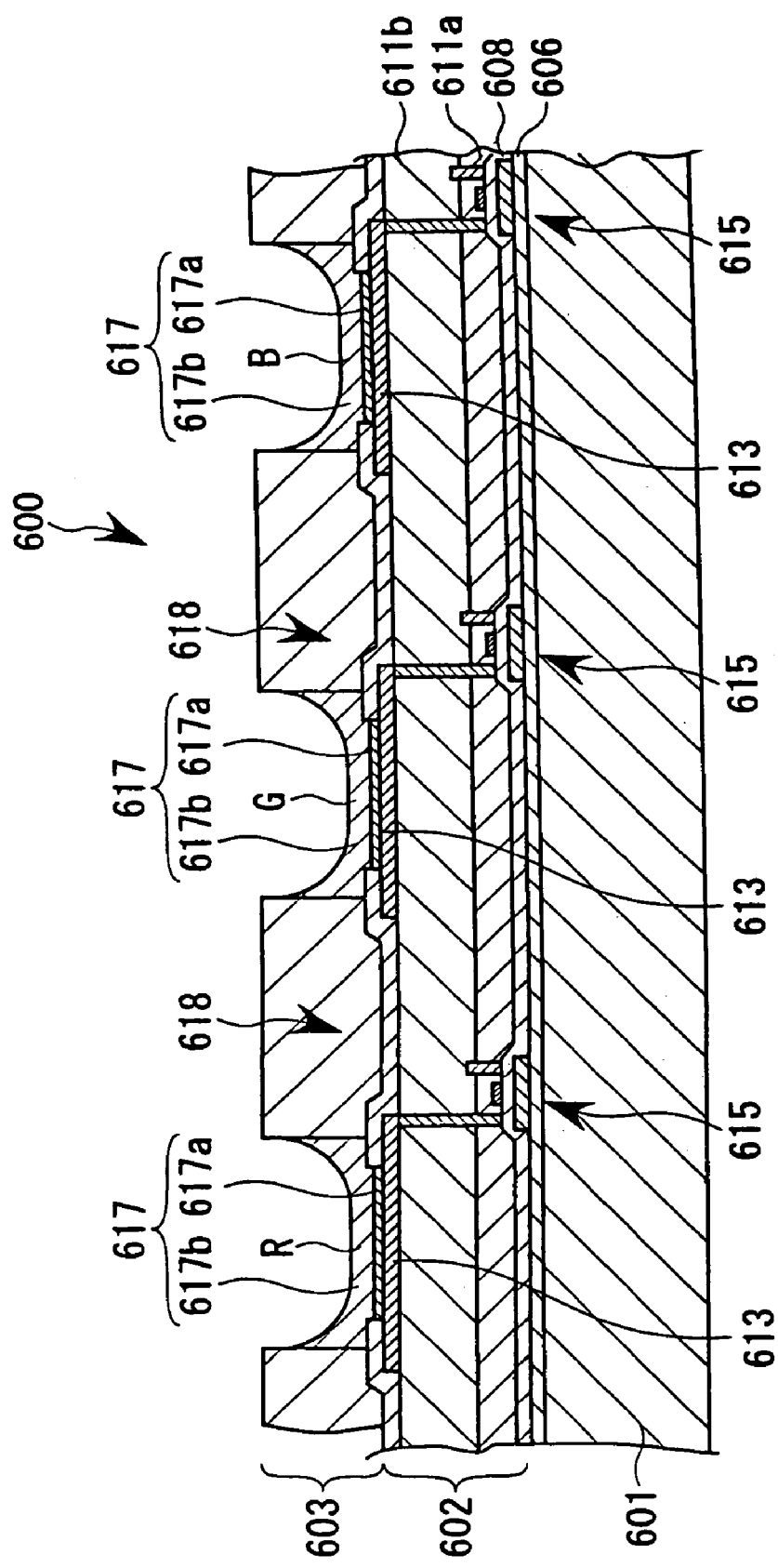
FIG. 25 is a process drawing showing the state in which the light emitting layer of each color has been formed.

As shown in FIGS. 24 and 25, after the light-emitting layers 617b corresponding to the blue (B), red (R) and green (G) have been formed, the drying step, or the like, is subsequently performed. As a result, the second composition of matter after ejection is subjected to the drying processing, and the non-polar solvent contained in the second composition of matter is evaporated, whereby the light-emitting layer 617b is formed on top of the hole injection/transport layer 617a. The order of forming the light-emitting layers 617b is not limited to the order as illustrated, but may be of any order. For example, it is possible to determine the order depending on the light-emitting layer forming material.

In the manner as described hereinabove, the function layer 617, i.e., the hole injection/transport layer 617a and the light-emitting layer 617b, is formed on the pixel electrode 613. Then, the process transfers to the opposite electrode forming step (S25).

Figure 26:
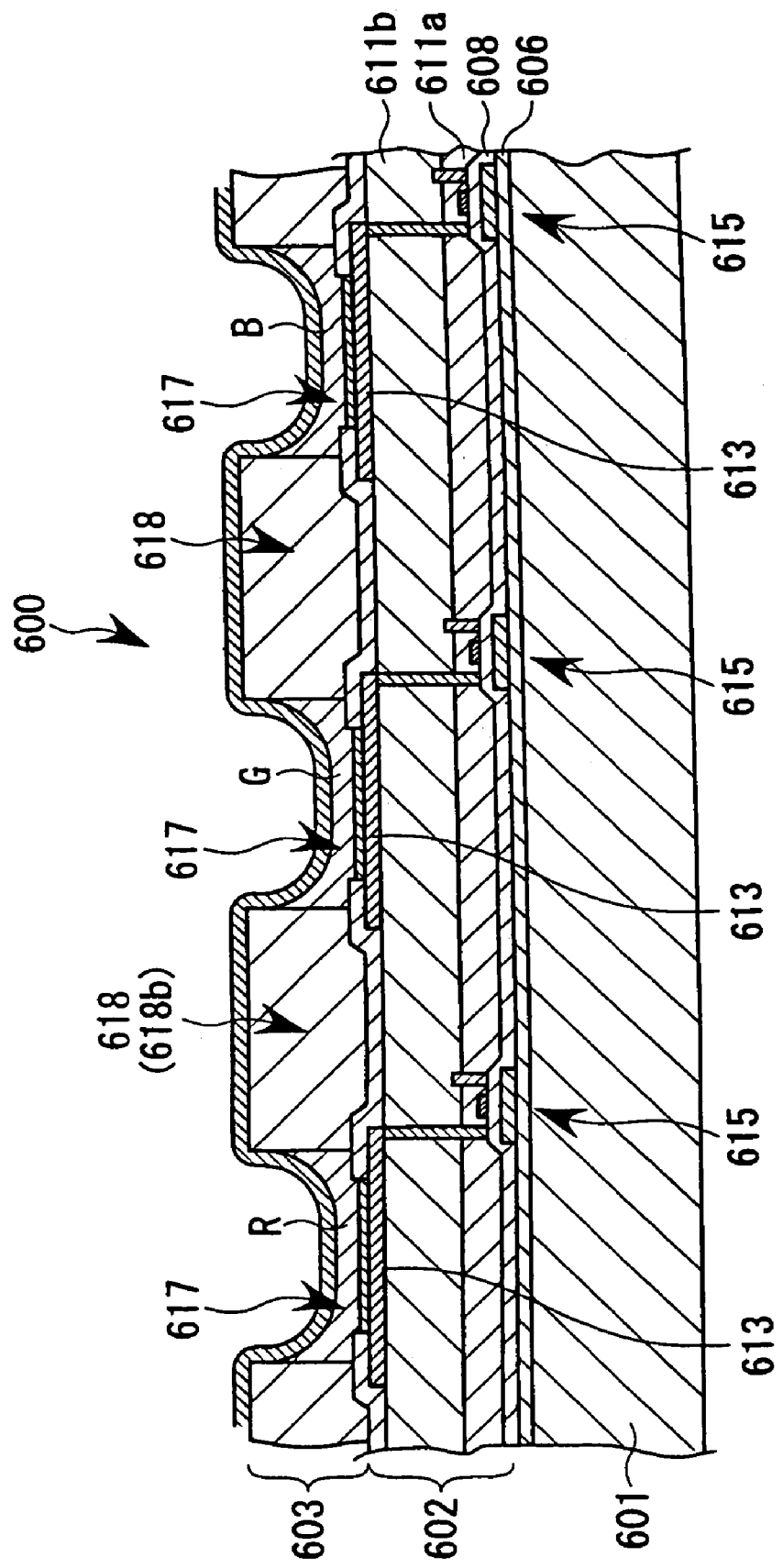
FIG. 26 is a process drawing showing the steps of manufacturing the cathode electrode.

At the opposite electrode forming step (S25), as shown in FIG. 26, the cathode 604 (opposite electrode) is formed over the entire surfaces of the light-emitting layer 617b and the organic matter bank layer 618b by means of vapor deposition method, sputtering method, chemical vapor deposition (CVD) method, or the like. This cathode 604 is constituted in this embodiment by laminating, e.g., a calcium layer and an aluminum layer.

On an upper part of the cathode 604, there are provided an Al film and an Ag film as electrodes and, on top thereof, a protection film for preventing oxidation such as an $SiO_2$ film, an SiN film, or the like.

After having formed the cathode 604 as described above, a sealing process for sealing the upper portion of the cathode 604 with a sealing material, a wiring processing, or the like, are performed to thereby obtain the display device 600.

A description will now be made about the third embodiment of this invention. FIG. 27 is an exploded perspective view showing an important part of the plasma type of display device (PDP device, simply referred to as a display device 700) which is a kind of display according to this invention. In the figure, the display device 700 is shown in a partly cut away state.

This display device 700 is made up of a first substrate 701 and a second substrate 702 which are disposed to lie opposite to each other, as well as a discharge display part 703 which is formed therebetween. The discharge display part 703 is constituted by a plurality of discharging chambers 705. Among these plurality of discharging chambers 705, the three chambers 705 of a red discharging chamber 705R, a green discharging chamber 705G, and a blue discharging chamber 705B are disposed as a set to make one pixel.

On an upper surface of the first substrate 701, there are formed address electrodes 706 in a stripe form at a given distance from one another. A dielectric layer 707 is formed to cover these address electrodes 706 and the upper surface of the first substrate 701. On the dielectric layer 707, there are vertically disposed partition walls 708 which are positioned between respective address electrodes 707 in a manner to lie along the respective address electrodes 706. Some of these partition walls 708 extend on both widthwise sides of the address electrodes 706 and others (not illustrated) extend at right angles to the address electrodes 706.

The regions which are partitioned by these partition walls 708 form the discharge chambers 705.

Inside the discharge chambers 705, there are disposed fluorescent bodies 709. The fluorescent bodies 709 emit luminescent light of any one of red (R), green (G) and blue (B). At the bottom of the red discharging chamber 705R, there are disposed red fluorescent bodies 709R, at the bottom of the green discharging chamber 705G, there are disposed green fluorescent bodies 709R, and at the bottom of the blue discharging chamber 705B, there are disposed blue fluorescent bodies 709B, respectively.

On the lower side of the second substrate 702 as seen in the figure, there are formed a plurality of display electrodes 711 in a direction crossing the address electrodes 706 at right angles at a predetermined distance from one another. In a manner to cover them, there are formed a dielectric layer 712 and a protection film 713 which is made of MgO, or the like.

The first substrate 701 and the second substrate 702 are oppositely adhered to each other in a state in which the address electrodes 706 and the display electrodes 711 cross each other at right angles. The address electrodes 706 and the display electrodes 711 are connected to an AC power source (not illustrated).

By charging electricity to each of the electrodes 706, 711, the fluorescent bodies 709 are caused to emit light through excitation, whereby color display becomes possible.

In this embodiment, the address electrodes 706, the display electrodes 711, and the fluorescent bodies 709 can be formed by using the liquid droplet ejection apparatus 1 as shown in FIG. 1. A description will now be made about an example of steps for manufacturing the address electrodes 706 on the first substrate 701.

In this case, the following steps are performed in a state in which the first substrate 126 is placed on the setting table of the liquid droplet ejection apparatus 1.

First, by means of the function liquid droplet ejection head 10, the liquid material (function liquid) containing therein a material for forming the conductive film wiring is caused to hit the address electrode forming region as the function liquid droplet. This liquid material is prepared as the electrically conductive film wiring (wiring formed by electrically conductive film) by dispersing electrically conductive fine particles of metals, or the like, into a dispersion medium. As the electrically conductive fine particles, there are used metallic fine particles containing therein gold, silver, copper, palladium, nickel, or the like, or an electrically conductive polymer, or the like.

Once all of the address electrode forming regions in which the liquid material is scheduled to be filled have been filled therewith, the liquid material after ejection is dried to evaporate the dispersion medium contained in the liquid material, whereby the address electrodes 706 are formed.

An example of the address electrodes 706 has been given hereinabove, but the display electrodes 711 and the fluorescent bodies 709 can also be formed by the above-described steps.

In forming the display electrodes 711, a liquid material (function liquid) containing therein the electrically conductive wiring forming material is caused to hit the display electrode forming region, in a similar manner as in the case of the address electrodes 706.

In forming the fluorescent bodies 709, on the other hand, a liquid material containing therein a fluorescent material (a kind of liquid material according to this invention) corresponding to each of the colors (R, G, B) is ejected from the three function liquid droplet ejection heads 10 to thereby cause them to hit the discharge chambers 705 of corresponding colors.

Figure 28:
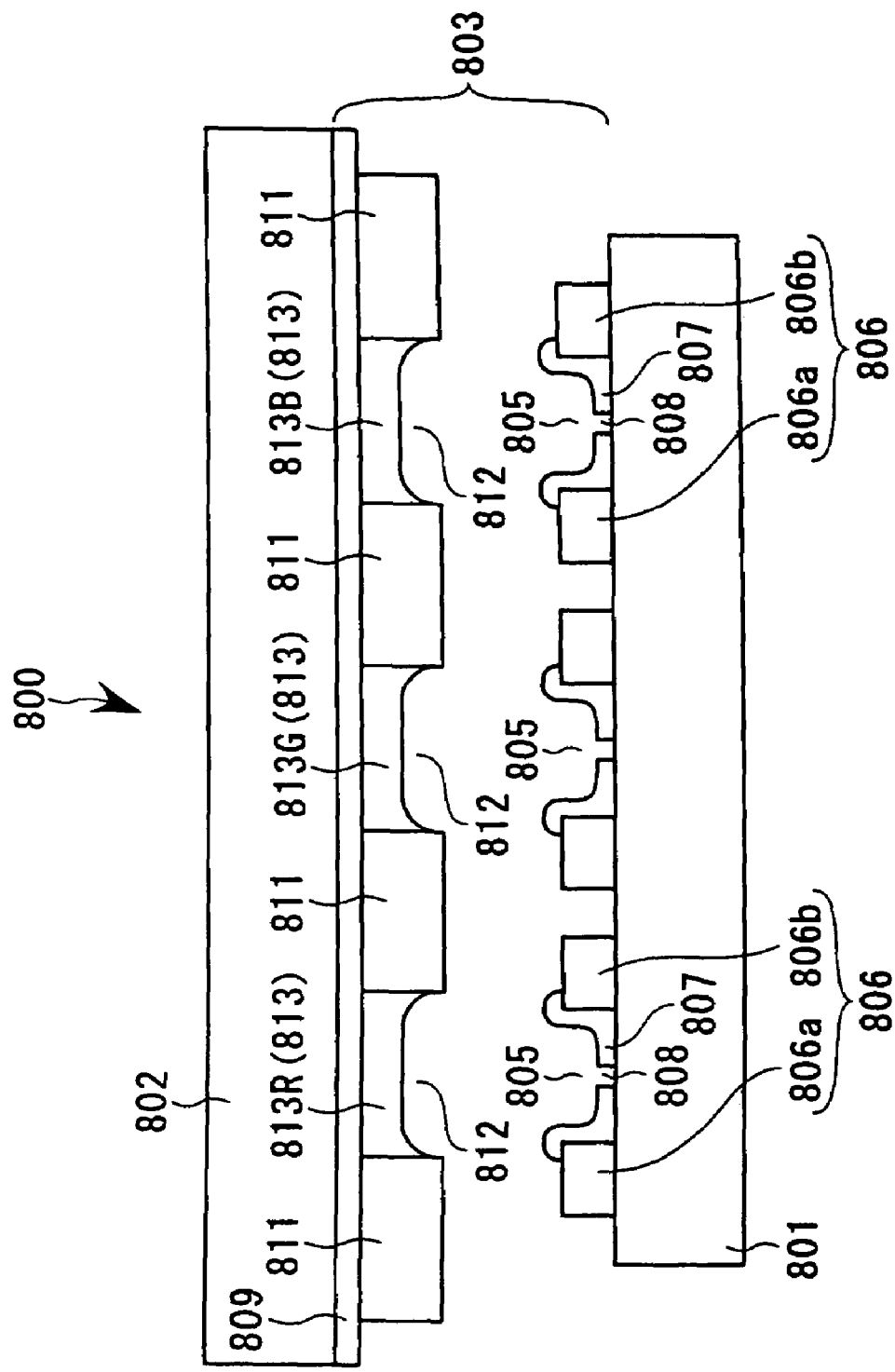
FIG. 28 is a sectional view of an important portion of the display device according to the fourth embodiment of this invention.

A description will now be made about a fourth embodiment of this invention. FIG. 28 is a sectional view showing an important part of the electron emission device (FED device, hereinafter simply referred to as a display device 800) which is a kind of the display device according to this invention. In the figure, the display device 800 is partly shown in section.

The display device 800 is made up of a first substrate 801 and a second substrate 802 which are disposed opposite to each other, as well as a field emission display part 803 which is formed therebetween. The field emission display part 803 is constituted by a plurality of electron emission parts 805 which are arranged in matrix.

On an upper surface of the first substrate 801, there are formed first element electrodes 806a and second electrodes 806b which constitute cathode electrodes 806, in a manner to cross each other at right angles. In each of the portions partitioned by the first element electrodes 806a and the second element electrodes 806b, there is formed an element film 807 with a gap 808 formed therein. In other words, a plurality of electron emission parts 805 are constituted by the first element electrodes 806a, the second element electrodes 806b and the element film 807. The element film 807 is made, e.g., of palladium oxide (PdO), or the like, and the gap 808 is formed by the work called forming, or the like, after having formed the element film 807.

On a lower surface of the second substrate 802, there is formed an anode electrode 809 which lies opposite to the cathode electrode 806. On a lower surface of the anode electrode 809, there is formed a lattice-shaped bank part 811. In each of the downward-looking openings 812 enclosed by the bank part 811, there is disposed a fluorescent member 813 in a manner to correspond to the electron emission part 805. The fluorescent body 813 emits light of either red (R), green (G), and blue (B). In each of the opening parts 812, there is disposed a red fluorescent body 813R, a green fluorescent body 813G, and a blue fluorescent body 813B in a predetermined pattern.

The first substrate 801 and the second substrate 802 constituted as described above are adhered to each other at a very small gap therebetween. In this display device 800, the electrons to be emitted from the first element electrode 806a and the second element electrode 806b as the cathode are excited and caused to emit light through the element film (gap 808) by causing them to hit the fluorescent body 813 formed on the anode electrode 809 which is the anode. Color display is thus possible.

In this case, too, as in the other embodiments, the first element electrode 806a, the second element electrode 806b, and the anode electrode 809 can be formed by using the liquid droplet ejection apparatus 1. Fluorescent bodies 813R, 813G, 813B of each color can be formed by using the liquid droplet ejection apparatus 1.

The liquid droplet ejection apparatus 1 which is constituted as described above can be applied to the manufacturing of the above-descried color filters to be mounted, e.g., on the mobile telephones, personal computers, various kinds of liquid crystal display devices, organic EL devices, FED devices, PDP devices, as well as to the electrophoretic display device, or the like. In addition, as other elctrooptic devices, there may be listed a device for forming metallic wiring, a device for forming a lens, a device for forming a resist, a device for forming an optical dispersion member, or a device for forming a preparation.

According to this invention, the function liquid droplet ejection head on the head stocker and the function liquid droplet ejection head on the carriage can be replaced by the head transfer mechanism depending on the necessity. Therefore, different function liquids can be ejected at a short time, with the result that the workpiece processing can be performed efficiently.

According to the elctrooptic device, the method of manufacturing the elctrooptic device, and the electronic device according to this invention, the device is manufactured by the liquid droplet ejection apparatus which is capable of various ejection of function liquids relative to the workpiece. Therefore, an elctrooptic device of high quality and low cot can be provided.

The entire disclosure of Japanese Patent Application Nos. 2002-226475 filed Aug. 2, 2002 and 2003-187837 filed Jun. 30, 2003 are incorporated by reference.

What is claimed is:

1. A liquid droplet ejection apparatus comprising:
   a function liquid droplet ejection head disposed such that a nozzle surface thereof lies in parallel with a workpiece;
   gap measuring means for measuring a workpiece gap between a workpiece surface and a nozzle surface;
   gap adjusting means for adjusting the workpiece gap based on a result of measurement by said gap measuring means, said adjusting being made by relative movement of said function liquid droplet ejection head and said workpiece in a vertical direction, and water head adjusting means for adjusting a water head of said function liquid droplet ejection head relative to a function liquid tank for supplying said function liquid droplet ejection head with a function liquid by vertically moving said function liquid droplet tank based on the result of measuring by said gap measuring means;

wherein said function liquid droplet ejection head is mounted on a sub-carriage, and wherein said gap adjusting means comprises:
 a base which supports said sub-carriage in a manner slidable in a vertical direction;
 an actuator which is fixed to said base;
 a male screw member which is rotated in one direction and in an opposite direction by said actuator; and
 a female screw member which is provided in said sub-carriage so as to engage in a screwed manner with said male screw member.

2. A liquid droplet ejection apparatus comprising:
a function liquid droplet ejection head disposed such that a nozzle surface thereof lies in parallel with a workpiece;
gap measuring means for measuring a workpiece gap between a workpiece surface and a nozzle surface; and
gap adjusting means for adjusting the workpiece gap based on a result of measurement by said gap measuring means, said adjusting being made by relative movement of said function liquid droplet ejection head and said workpiece in a vertical direction,
wherein said gap adjusting means moves said function liquid ejection head in a vertical direction relative to the workpiece, said apparatus further comprising:
 a function liquid tank for supplying said function liquid droplet ejection head with a function liquid; and
 water head adjusting means for adjusting a water head of said function liquid ejection head relative to said function liquid tank by vertically moving said function liquid droplet tank based on the result of measuring by said gap measuring means.

3. The apparatus according to claim 2, wherein sad function liquid tank is held by a tank holder, and wherein said water head adjusting means comprises:
 a tank base for supporting said tank holder in a manner slidable in a vertical direction;
 an actuator which is fixed to said tank base;
 a male screw member which is rotated by said actuator in one direction and in an opposite direction; and
 a female screw member which is provided in said tank holder so as to be engaged in a screwed manner with said male screw member.

4. The apparatus according got claim 2, further comprising:
 a function liquid supply means for supplying said function liquid tank with a function liquid; and
 a liquid level sensor for detecting a liquid level inside said function liquid tank,
 wherein said function liquid supply means supplies the function liquid so as to attain a constant liquid level in said function liquid tank based on a result of detection by said liquid level sensor.

5. A liquid droplet ejection apparatus comprising:
a function liquid droplet ejection head disposed such that a nozzle surface thereof lies in parallel with a workpiece;
gap measuring means for measuring a workpiece gap between a workpiece surface and a nozzle surface;
gap adjusting means for adjusting the workpiece gap based on a result of measurement by said gap measuring means, said adjusting being made by relative movement of said function liquid droplet ejection head and said workpiece in a vertical direction; and
wherein head adjusting means for adjusting a water head of said function liquid droplet ejection head relative to a function liquid tank for supplying said function liquid droplet ejection head with a function liquid by vertically moving said function liquid droplet tank based on the result of measuring by said gap measuring means;
wherein said function liquid droplet ejection head is mounted on a carriage, and wherein said gap measuring means comprises:
 position measuring means for measuring a position of the workpiece in a vertical direction, said position measuring means being mounted on said carriage; and
 computing means for computing the workpiece gap based on a result of measurement by said position measuring means.

6. A liquid droplet ejection apparatus comprising:
a function liquid droplet ejection head disposed such that a nozzle surface thereof lies in parallel with a workpiece;
gap measuring means for measuring a workpiece gap between a workpiece surface and a nozzle surface;
gap adjusting means for adjusting the workpiece gap based on a result of measurement by said gap measuring means, said adjusting being made by relative movement of said function liquid droplet ejection head and said workpiece in a vertical direction; and
water head adjusting means for adjusting a water head of said function liquid droplet ejection head relative to a function liquid tank for supplying said function liquid droplet ejection head with a function liquid by vertically moving said function liquid droplet tank based on the result of measuring by said gap measuring means;
wherein said workpiece is set in position on a worktable, and wherein said gap measuring means comprise:
 position measuring means for measuring a position of the workpiece and a position of the worktable in a vertical direction; and
 computing means for computing the workpiece gap based on a result of measurement by said position measuring means.

* * * * *

UNITED STATES PATENT AND TRADEMARK OFFICE
CERTIFICATE OF CORRECTION

PATENT NO. : 7,036,906 B2
APPLICATION NO. : 10/632554
DATED : May 2, 2006
INVENTOR(S) : Yutaka Takano et al.

It is certified that error appears in the above-identified patent and that said Letters Patent is hereby corrected as shown below:

Title Page, column 1, (75) Inventors:, Line 1, "Nagano-ken" should be --Asahi--

Title Page, column 1, (75) Inventors:, Line 4, "Shimosuwa-machi" should be --Shimosuwa--

Title Page, column 2, FOREIGN PATENT DOCUMENTS, Line 1, "2/1987" should be --2/1997--

Title Page, column 2, (57) ABSTRACT, delete entire abstract and replace with --The liquid droplet ejection apparatus is made up of: a function liquid droplet ejection head which is disposed in parallel with the surface of a nozzle of the ejection head relative to a workpiece; a device for measuring a gap between the surface of the workpiece and the surface of the nozzle; and a device for adjusting the gap based on the result of measurement by the device for measuring the gap. The gap between the workpiece and the function liquid droplet ejection head is automatically fine-adjusted.

Col. 1, line 42: "ling." should be --long.--

Col. 3, line 60: "necesscity," should be --necessity,--

Col. 5, line 61: "elctrooptic" should be --electrooptic--

Col. 5, line 62: "elctrooptic" should be --electrooptic--

Col. 7, line 49: "racket" should be --bracket--

Col. 10, line 21: "This" should be --These--

Col. 10, line 23: "word," should be --words,--

Col. 12, line 48: "24;" should be --124;--

Col. 14, line 38: "suing" should be --using--

Col. 15, line 11: "deice" should be --device--

Col. 19, line 12: "508R", second occurrence, should be --508B--

Col. 26, line 49: "709R," should be --709G,--

Col. 28, line 32: "above-descried" should be --above-described--

UNITED STATES PATENT AND TRADEMARK OFFICE
CERTIFICATE OF CORRECTION

PATENT NO. : 7,036,906 B2
APPLICATION NO. : 10/632554
DATED : May 2, 2006
INVENTOR(S) : Yutaka Takano et al.

It is certified that error appears in the above-identified patent and that said Letters Patent is hereby corrected as shown below:

Col. 28, line 36: "elctrooptic" should be --electrooptic--

Col. 28, line 48: "elctrooptic" should be --electrooptic--

Col. 28, line 49: "elctrooptic" should be --electrooptic--

Col. 28, line 53: "elctrooptic" should be --electrooptic--

Col. 28, line 54: "cot" should be --cost--

Col. 29, line 52, Claim 4: "got" should be --to--

Col. 30, line 14, Claim 5: "wherein" should be --water--

Signed and Sealed this

Tenth Day of April, 2007

JON W. DUDAS
*Director of the United States Patent and Trademark Office*